(12) United States Patent
Honjo et al.

(10) Patent No.: US 7,769,285 B2
(45) Date of Patent: Aug. 3, 2010

(54) IMAGING DEVICE

(75) Inventors: Kenichi Honjo, Osaka (JP); Kyoichi Miyazaki, Osaka (JP); Mitsuyoshi Okamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 615 days.

(21) Appl. No.: 11/795,561

(22) PCT Filed: Feb. 6, 2006

(86) PCT No.: PCT/JP2006/001998

§ 371 (c)(1),
(2), (4) Date: Jul. 18, 2007

(87) PCT Pub. No.: WO2006/082967

PCT Pub. Date: Aug. 10, 2006

(65) Prior Publication Data

US 2008/0131109 A1    Jun. 5, 2008

(30) Foreign Application Priority Data

Feb. 7, 2005   (JP) ............................. 2005-030264
Apr. 12, 2005   (JP) ............................. 2005-114992

(51) Int. Cl.
*G03B 13/34* (2006.01)
(52) U.S. Cl. .................. 396/101; 348/333.03
(58) Field of Classification Search ............... 396/101; 348/333.03
See application file for complete search history.

(56) References Cited

U.S. PATENT DOCUMENTS

| 4,872,058 A * | 10/1989 | Baba et al. .................. 348/352 |
| 6,072,525 A | 6/2000 | Kaneda |
| 2002/0018136 A1* | 2/2002 | Kaji et al. ............... 348/333.02 |
| 2004/0238718 A1 | 12/2004 | Washisu |

FOREIGN PATENT DOCUMENTS

| JP | 60-254108 | 12/1985 |
| JP | 01-175373 | 7/1989 |
| JP | 03-149512 | 6/1991 |
| JP | 04-158322 | 6/1992 |
| JP | 8-29826 | 2/1996 |
| JP | 2004-037733 | 2/2004 |
| JP | 2004-357040 | 12/2004 |

OTHER PUBLICATIONS

Japanese Notice of Reasons for Rejection issued in Patent Application No. JP 2007-501666 dated on Sep. 17, 2008.

* cited by examiner

*Primary Examiner*—W. B. Perkey
*Assistant Examiner*—Fang-Chi Chang
(74) *Attorney, Agent, or Firm*—McDermott Will & Emery LLP

(57) ABSTRACT

A focus area contains one or more areas, into which an image signal captured by an image sensor (14) is segmented by an image segmentation section (15). The focus area follows movement of an object in accordance with feature point positional information of an image extracted by a feature point extraction section (34) and a feature point positional calculation section (35). Further, after a low-pass filter (36) extracts a low frequency component of a time-series oscillation frequency using the feature point positional information, and a focus area selection section calculates a display position, the focus area is displayed on a display section (17). Therefore, an imaging device, which does not cause discomfort even when the focus area displayed on the display section (17) fluctuates by tracking movement of the object, is provided.

10 Claims, 26 Drawing Sheets

FIG. 7

```
V = max (R, G, B)                    EXPRESSION 1
d = V - min (R, G, B)                EXPRESSION 2
S = d * 255 / V                      EXPRESSION 3
if (S=0) {H=0}                       EXPRESSION 4
else {
  if (V=R) H = (G-B) * 60 / d        EXPRESSION 5
  if (V=G) H = (B-R) * 60 / d + 120  EXPRESSION 6
  if (V=B) H = (R-G) * 60 / d + 240  EXPRESSION 7
}
if (H<0) {H = H + 360}               EXPRESSION 8
```

IMAGING DEVICE

RELATED APPLICATIONS

This application is the U.S. National Phase under 35 U.S.C. §371 of International Application No. PCT/2006/301988 filed on Feb. 6, 2006, which in turn claims the benefit of Japanese Application No. 2005-030264, filed on Feb. 7, 2005 and Japanese Application No. 2005-114992, filed on Apr. 12, 2005, the disclosures of which Applications are incorporated by reference herein.

TECHNICAL FIELD

The present invention relates to an imaging device such as a digital still camera, a digital video camera or the like. More particularly, the present invention relates to an imaging device, such as a digital still camera, a digital video camera or the like, having an auto-focusing function.

BACKGROUND ART

Nowadays, an imaging device such as a digital still camera, a digital video camera or the like, which includes an image sensor such as a CCD or a CMOS, has seen an explosive prevalence. In general, the imaging device which detects a focusing state based on an image signal of an object and performs auto-focusing control by moving, based on a result of the detection, a focusing lens unit included in an imaging optical system in an optical axis direction has been prevailing.

Accompanied with an increase in functionality of an imaging device, sophistication in a function of auto-focusing control has been demanded. For example, an auto-focusing device which is adapted to the imaging device and performs focusing adjustment is disclosed in patent document 1. The auto-focusing device segments an image signal of an object into a plurality of focus areas, counts the number of skin color pixels included in each of the focus areas, and specifies one focus area used for the focusing adjustment.

In the conventional auto-focusing device disclosed in the patent document 1, a person is assumed as a main object. In other words, the auto-focusing device performs focusing control based on the skin color pixels so that the focus area follows a person, thereby invariably allowing accurate focusing on a person.

[Patent document] Japanese Laid-Open Patent Publication No. 2004-37733

DISCLOSURE OF THE INVENTION

Problems to be Solved by the Invention

The conventional auto-focusing device disclosed in the patent document 1 assumes that focus tracking is performed so as to follow a person, and an area in which the focus tracking is performed is indicated by a marker or the like, or is selected from the plurality of focus areas for display. In this case, however, a position of the marker or the selected focus area, which is displayed on a monitor screen before shooting, fluctuates in a jiggling manner due to vibration or the like of a body of the auto-focusing device, leading to a problem of great difficulty in seeing the monitor screen. In particular, in a case where shooting at a large magnification is performed, the above-mentioned influence is notable.

In the conventional auto-focusing device disclosed in the patent document 1, it is required to perform feature point extraction for the focus tracking in a large area of the monitor screen, causing a heavy load of arithmetic processing. Furthermore, since only a person is assumed as a main object, the focus tracking for other objects cannot be performed. Since a main object shot by a digital still camera, a digital video camera, etc., is not limited to a person, the conventional auto-focusing device disclosed in the patent document 1 cannot sufficiently meet a user's demand.

Therefore, an object of the present invention is to provide an imaging device which is capable of performing focusing adjustment on a moving object and preventing unnecessary fluctuation of a focus area to be displayed.

Solution to the Problems

The above object of the present invention is achieved by an imaging device having the following configuration. The imaging device which outputs an electrical image signal of an object, comprises: an imaging optical system, which includes a focus lens unit for focusing, for forming an optical image of the object; an image sensor for imaging the optical image of the object and converting the optical image to the electrical image signal; an image segmentation section for segmenting the image signal to a plurality of areas; a focusing information calculation section for calculating focusing information for the imaging optical system in a first area group including at least one area among the plurality of areas; a lens driving control section for, based on the focusing information, drive-controlling the focus lens unit in an optical axis direction; a feature point extraction section for extracting a feature point of the object in a second area group including at least one area among the plurality of areas and for outputting the feature point as feature point positional information indicating a position of the feature point; a low pass filter for extracting a low frequency component of a time-oscillation frequency contained in the feature point positional information and for outputting the low frequency component as extracted positional information; and an area selection section for, based on the extracted positional information, calculating a position of the second area group to be displayed and for outputting the position as display positional information.

EFFECT OF THE INVENTION

According to the present invention, provided is an imaging device which is capable of performing focusing on a moving object and preventing unnecessary fluctuation of a focus area to be displayed.

BRIEF DESCRIPTION OF THE DRAWINGS

FIG. 7 shows operation expressions for hue and saturation information in the embodiment 1.

Figure 1:
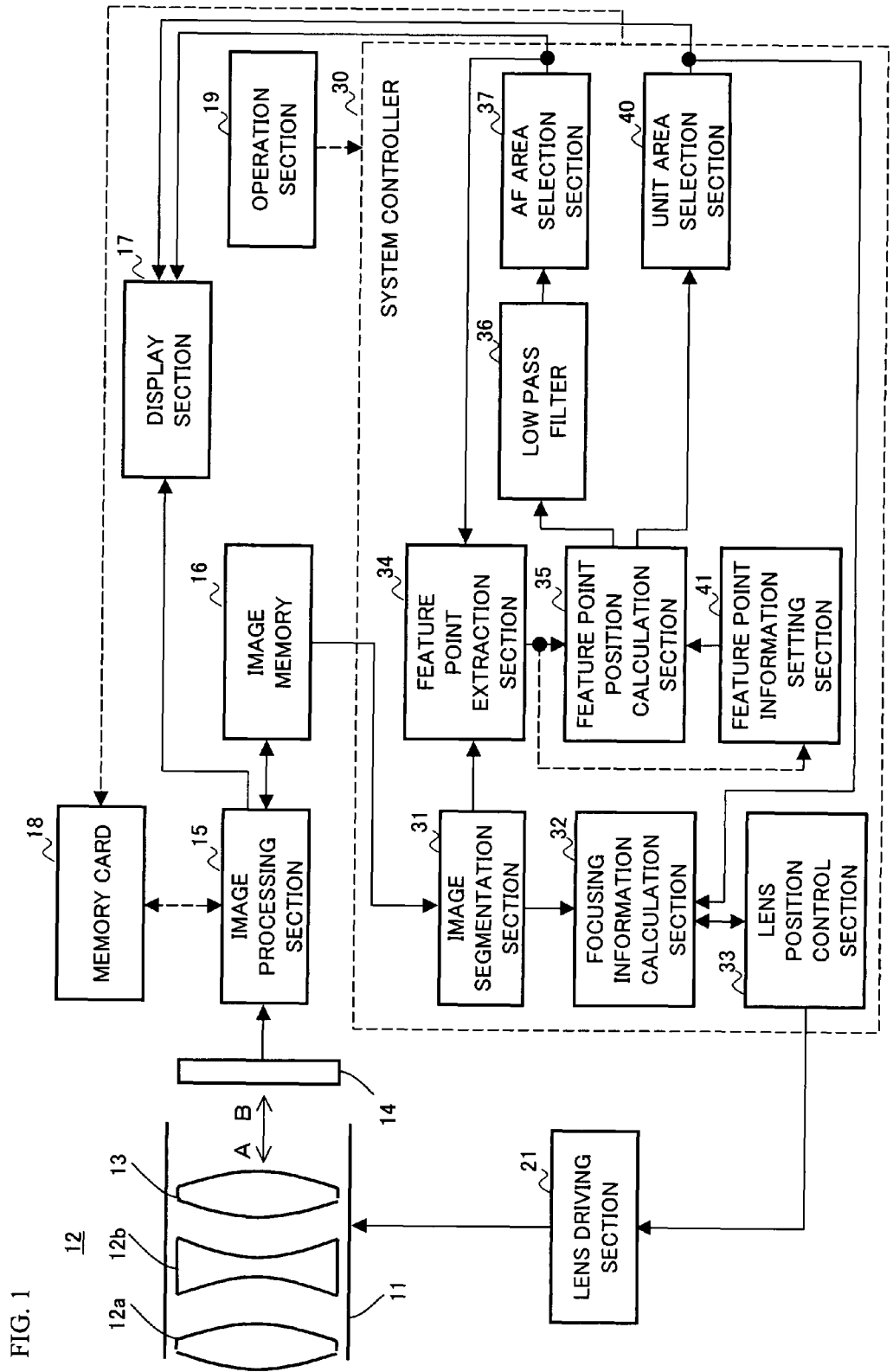
FIG. 1 is a block diagram illustrating an imaging device according to an embodiment 1 of the present invention.

DESCRIPTION OF THE REFERENCE CHARACTERS 10 body of imaging device
10a finder
11 lens barrel
12 zoom lens
13 focus lens
14 CCD
15 image processing section
16 image memory
17, 67 display section
18 memory card
19 operation section
19a shutter button
19b cursor key
19c decision button
19d menu button
21 lens driving section
30 system controller
31 image segmentation section
32 focusing information calculation section
33 lens position control section
34 feature point extraction section
35 feature point position calculation section
36 low pass filter
37 AF area selection section
40 unit area selection section
41 feature point information setting section
42 focal length operation section
43 area alteration section

BEST MODE FOR CARRYING OUT THE INVENTION

Embodiment 1

FIG. 1 is a block diagram illustrating an imaging device according to an embodiment 1 of the present invention. The imaging device according to the embodiment 1 comprises a lens barrel 11, a zoom lens system 12 and a focus lens 13 which serve as an imaging optical system, a CCD 14 which is an image sensor, an image processing section 15, an image memory 16, a display section 17, an operation section 19, a lens driving section 21, and a system controller 30.

The lens barrel 11 holds the zoom lens system 12 inside thereof. The zoom lens system 12 and the focus lens 13 serve as the imaging optical system for forming an optical image of an object in a magnification-variable manner. The imaging optical system includes, in the order starting from the object side, the zoom lens units 12a and 12b which move from an object side in order along an optical axis when varying magnification and the focus lens 13 which moves along the optical axis for adjusting a focusing state.

The CCD 14 is the image sensor which captures an optical image formed by the zoom lens system 12 at predetermined timing and converts the image to an electrical image signal to be outputted. The image processing section 15 is a processing section which subjects the image signal, outputted from the CCD 14, to predetermined image processes such as white balance compensation and γ compensation. The image memory 16 temporarily stores the image signal outputted from the image processing section 15.

The display section 17, which is typically a liquid crystal display, receives the image signal outputted from the CCD 14 or the image signal stored in the image memory 16 via the image processing section 15 and displays the image signal as a visible image for a user in accordance with an instruction from a system controller 30, which will be mentioned below. The image processing section 15 is bidirectionally accessible to/from a memory card 18 which can be detached by a user. The memory card 18 receives and stores the image signal outputted from the CCD 14 or the image signal stored in the image memory 16 via the image processing section 15, and outputs the stored image signal to the image memory 16 via the image processing section 15 for temporarily storing of the image signal in accordance with an instruction from the system controller 30, which will be mentioned below.

The operation section 19 is provided on the outside of a body of the imaging device and includes buttons with which a user performs setting or operations of the body of the imaging device. The operation section 19 includes a plurality of buttons, details of which will be described below with reference to FIG. 3.

The lens driving section 21 outputs a drive signal for driving the focus lens 13 in an optical axis direction (A direction or B direction) in accordance with an instruction from a lens position control section 33 of the system controller 30, which will be mentioned below. The lens driving section 21 has a function of driving the zoom lens 12 in the direction along the optical axis when a user operates a zoom lever (not shown).

The system controller 30 includes an image segmentation section 31, a focusing information calculation section 32, a lens position control section 33, a feature point extraction section 34, a feature point position calculation section 35, a low pass filter 36, an AF area selection section 37, and a unit area selection section 40.

The image segmentation section 31 performs a process of segmenting the image signal outputted from the image memory 16 into a plurality of unit areas.

The focusing information calculation section 32 calculates a defocusing amount based on contrast information of each of the unit areas and positional information of the focus lens 13 with respect to the image signal which is segmented for the plurality of unit areas by the image segmentation section 31. The focusing information calculation section 32 calculates the defocusing amount in a first area group including at least one unit area. In the present embodiment, the first area group is a group consisting of minimum unit area(s) for which a process of extracting a feature point of an object and a process of calculating a defocusing amount, which will be mentioned below, are performed.

The lens position control section 33 generates a control signal for controlling a position of the focus lens 13 based on the defocusing amount outputted from the focusing information calculation section 32, and outputs the signal to the lens driving section 21. The lens position control section 33 outputs, to the focusing state calculation section 32, positional information obtained when the focus lens 13 is driven by the lens driving section 21. Thereupon, the focusing state calculation section 32 can calculate the defocusing amount using the positional information of the focus lens 13 and the contrast information.

The feature point extraction section 34 extracts a feature point of each of the unit areas of the image signal which is segmented by the image segmentation section 31 for the plurality of unit areas. In the present embodiment, the feature point extraction section 34 calculates color information as a feature point of each of the unit areas and outputs the calculated color information to the feature point position calculation section 35. A feature point is extracted from a second area group including at least one unit area. In the present embodiment, descriptions will be given assuming that an area from which a feature point is extracted is determined based on display positional information, which indicates a range of an AF area and is outputted from the AF area selection section 37, which will be mentioned below. The feature point extraction section 34 calculates color information as a feature point of each of some unit areas, which are a part of the unit areas segmented from the image signal and are included in a range of the feature point setting area, in accordance with the display positional information which indicates a range of a feature point setting area and is outputted from the below-mentioned AF area selection section 37, and outputs the information to a feature point information setting section 41.

The feature point information setting section 41 calculates and stores a piece of color information of a unit area, which is selected by a user, based on the color information of the respective unit areas, which are outputted from the feature point extraction section 34, thereby performing a feature point information setting process. The feature point information setting section 41 includes a nonvolatile memory and is capable of holding reference color information, which has been once stored, even if the body of the imaging device is turned off. When imaging processing with focus tracking is performed, the feature point information setting section 41 reads out the stored color information and outputs the information to the feature point position calculation section 35.

The feature point position calculation section 35 calculates a position where a feature point of each of the unit areas, which is outputted from the feature point extraction section 34, substantially matches with a feature point which is outputted from the feature point information setting section 41 based on a comparison there between. In the present embodiment, the feature point position calculation section 35 calculates a position where color information of each of the unit areas substantially match with color information outputted from the feature point information setting section 41 based on a comparison there between. The feature point position calculation section 35 outputs the feature point positional information obtained by the calculation to the low pass filter 36 and the unit area selection section 40. The feature point positional information indicates, for example, coordinates.

The low pass filter 36 extracts low frequency components of a time-series oscillation frequency in feature point positional information by removing high frequency components from the feature point positional information outputted from the feature point position calculation section 35. For example, the low pass filter extracts the low frequency components of the feature point positional information based on an average calculated by averaging pieces of feature point positional information or a moving average calculated by averaging pieces of feature point positional information, which are obtained within a predetermined period of time. The low pass filter 36 outputs a value of the extracted low frequency component, as extracted positional information, to the AF area selection section 37.

The AF area selection section 37 generates display positional information indicating a position of an AF area to be displayed on the display section 17 in accordance with the extracted positional information outputted from the low pass filter 36, and outputs the information to the feature point extraction section 34 and the display section 17. When an AF area is first displayed in imaging processing with focus tracking, the AF area selection section 37 reads out display positional information of a default, which has been previously stored in a memory which is not shown, and outputs the information to the feature point extraction section 34 and the display section 17.

When a feature point setting area is first displayed in feature point information setting processing, the AF area selection section 37 reads out display positional information of a default, which has been previously stored in a memory which is not shown, and outputs the information to the feature point extraction section 34 and the display section 17.

The unit area selection section 40 selects a unit area being present at a position indicated by the feature point positional information in accordance with the feature point positional information outputted from the feature point position calculation section 35. For example, if the feature point positional information indicates coordinates, the unit area selection section 40 selects a unit area containing coordinates outputted from the feature point position calculation section 35. And the unit area selection section 40 causes the display section 17 to display a unit area frame enclosing the selected unit area.

Figure 2:
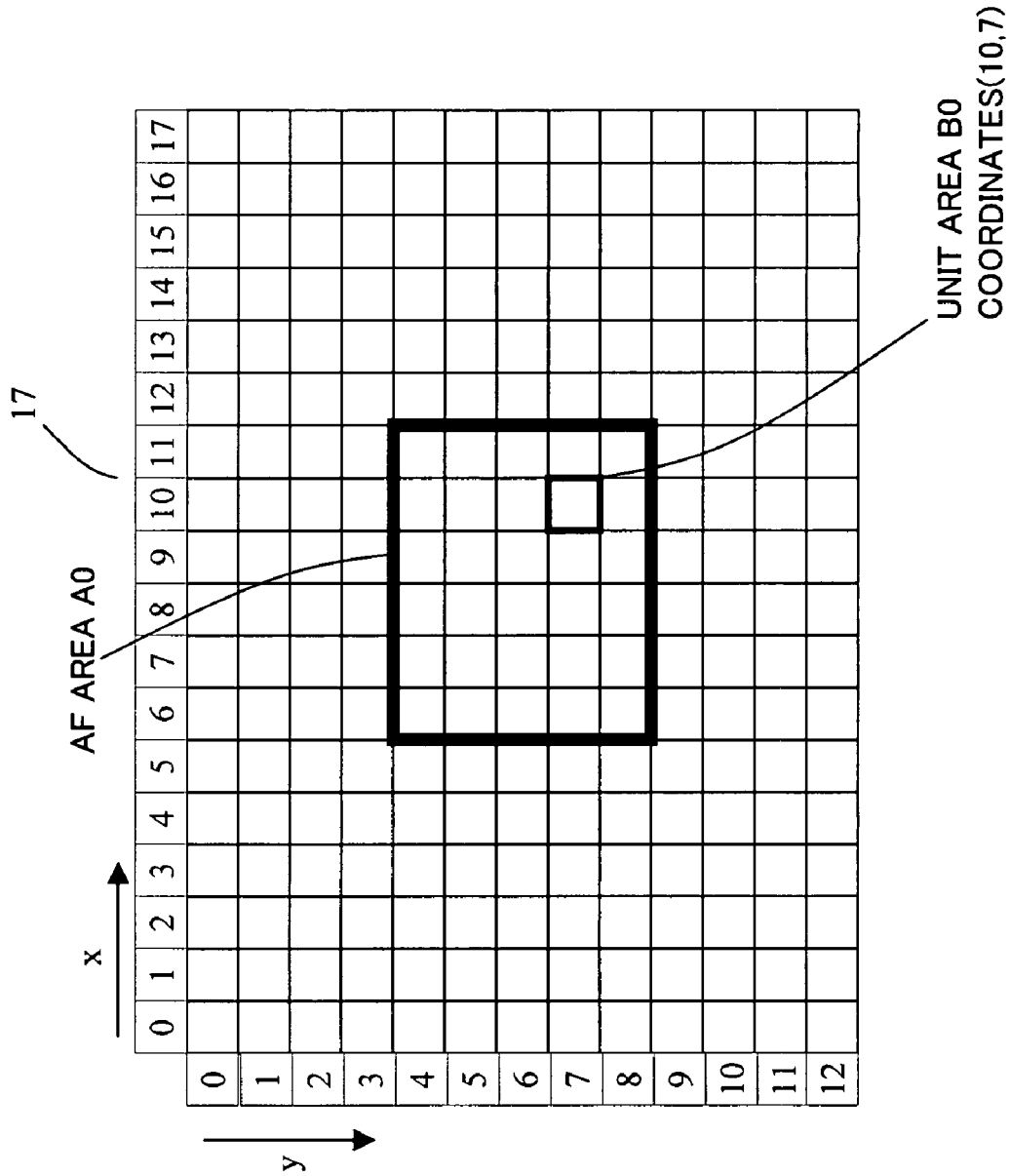
FIG. 2 is a diagram showing a display position of area frames displayed on a display section 17.

Next, the AF area and the unit area will be described. FIG. 2 is a diagram showing an area frame to be displayed on the display section 17. FIG. 2 shows an example in which an image signal to be displayed on the display section 17 is divided into 18 segments in a horizontal direction (x direction) and into 13 segments in a vertical direction (y direction). In this case, the image signal is segmented into 18×13 unit areas, and unit area frames respectively enclosing the 18×13 unit areas are displayed on the display section 17.

In FIG. 2, a unit area B0 represents one unit area for which processing of extracting a feature point of an object and processing of calculating focusing information, which will be described below, are performed. In this example, the unit area B0 is shown by coordinates 10, 7). The 18×13 unit area frames may not necessarily be displayed and only a unit area frame enclosing a unit area selected by the unit area selection section 40 may be displayed. For example, if all the area frames are displayed, the unit area frames may be displayed by using thin lines or faint-colored lines in order to improve viewability of a display on the display section 17.

During the imaging processing with focus tracking, which will be mentioned below, an AF area frame enclosing an AF area A0, which consists of one or more unit areas, is displayed on the display section 17. The AF area A0 is an area in which a feature point is extracted in the imaging processing with focus tracking of an object.

Figure 3:
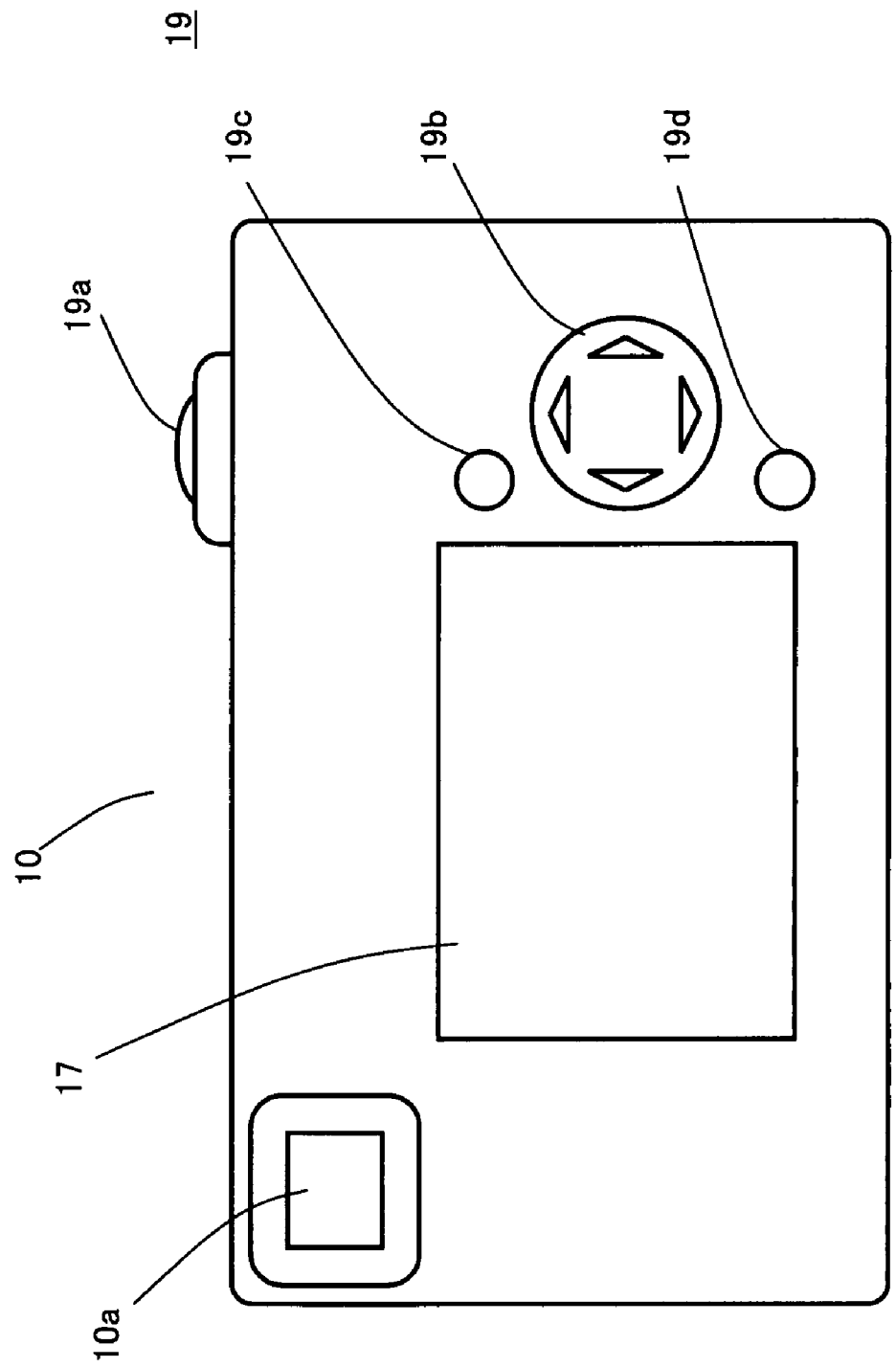
FIG. 3 is a schematic diagram illustrating a rear view of a body of the imaging device according to the embodiment 1 of the present invention.

FIG. 3 is a schematic diagram illustrating a rear view of a body of the imaging device according to the embodiment 1 of the present invention. The imaging device of the embodiment 1 includes a body 10 of the imaging device, the display section 17, the operation section 19, and a finder 10a.

The finder 10a is an optical system which optically leads an image of an object to user's eyes. The display section 17 is the liquid crystal display as mentioned above and displays a shot image signal as a visible image for a user. The operation section 19 includes a shutter button 19a, a cursor key 19b, a decision button 19c, and a menu button 19d.

The shutter button 19a causes the imaging processing with focus tracking to start when pressed by a user halfway down and causes a shot image to be stored in the memory card when pressed by the user all the way down. The cursor key 19b is operated to select an item and contents thereof from a menu of each of various operation modes which are displayed on the display section 17. The decision button 19c is operated to determine the contents selected by operating the cursor key 19b. The menu button 19d is operated to perform a menu display for each of various general operation modes of the body of the imaging device.

Whether or not a process of storing the feature point information of a shot image signal on the display section 17 (feature point information setting), which will be described below, is started is contained as an item of each of the various operation modes. When a user operates the menu button 19d and causes the display section 17 to display a menu regarding a start of the feature point information setting processing, the cursor key 19b accepts a selection of the contents through a user's operation. In this state, when the user operates the cursor key 19b to select the start of the feature point information setting processing, and subsequently operates the decision button 19c, the feature point information setting processing is started by the feature point information setting section 41.

Figure 4:
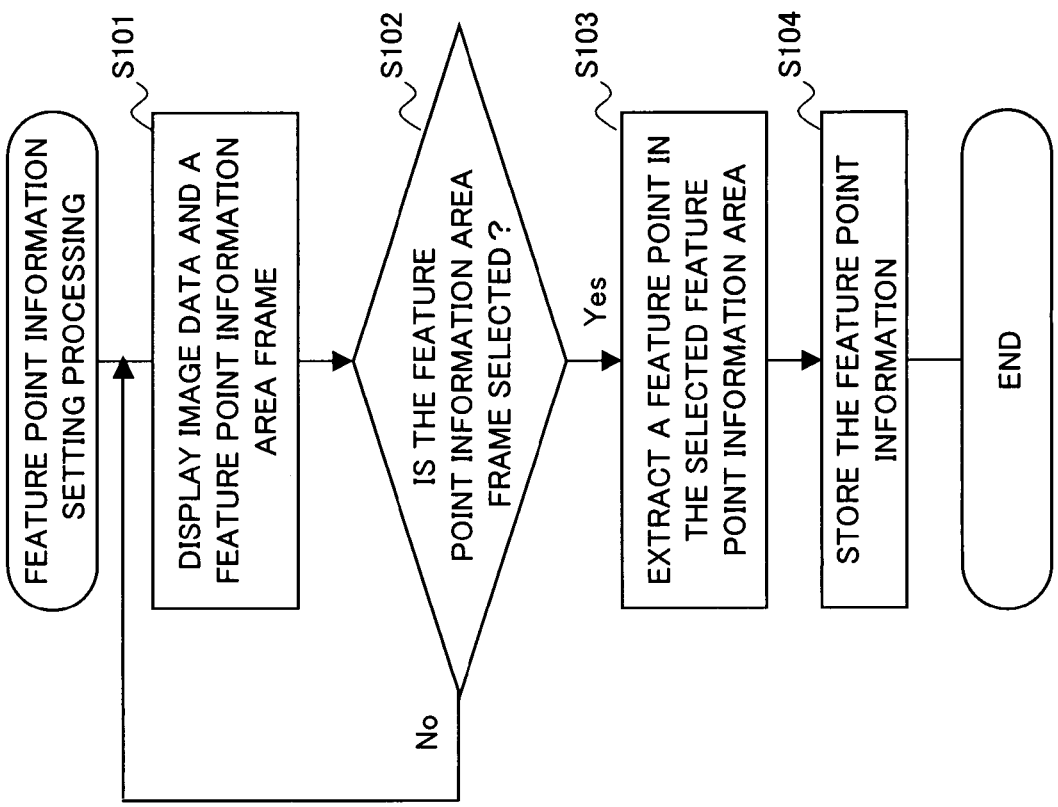
FIG. 4 is a flowchart showing operations of the imaging device in reference color information setting processing.
Figure 5:
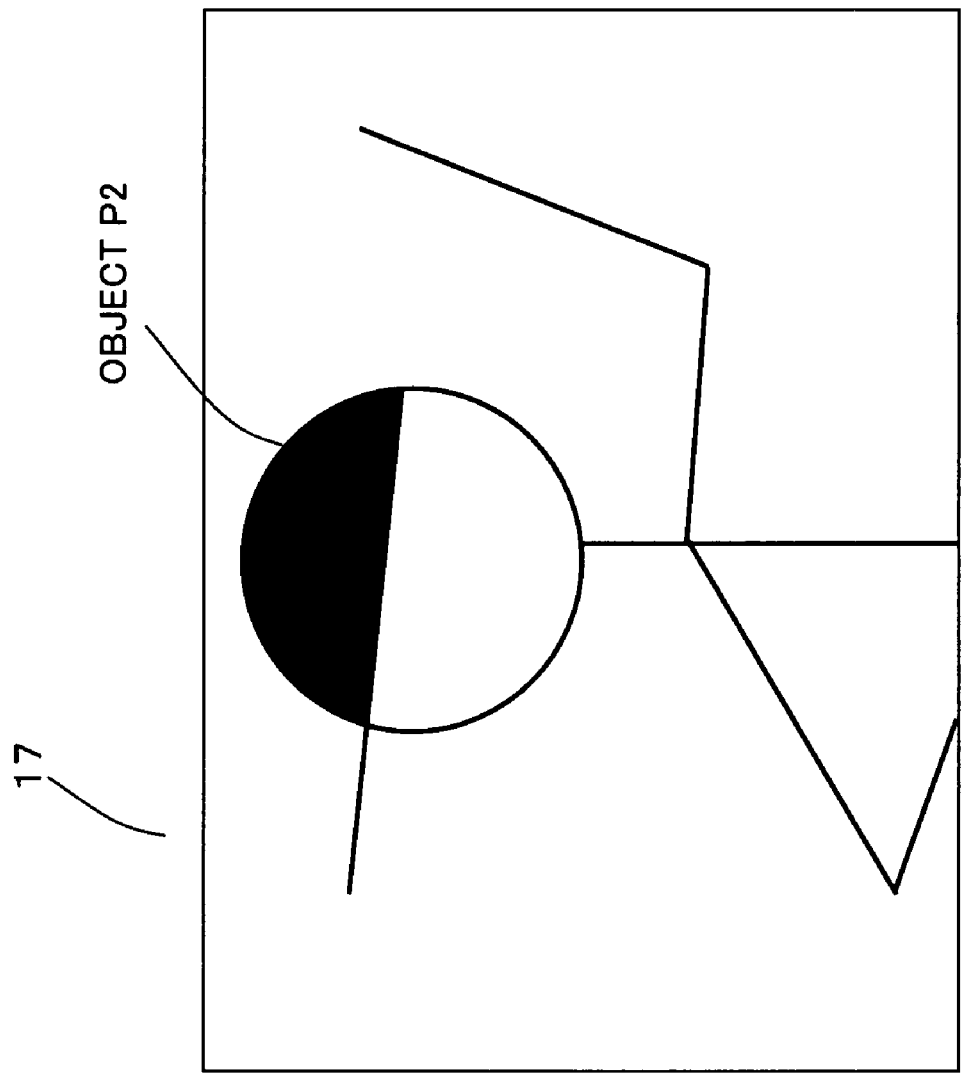
FIG. 5 is a diagram illustrating a schematic view of the display section 17 on which an object is displayed.
Figure 6:
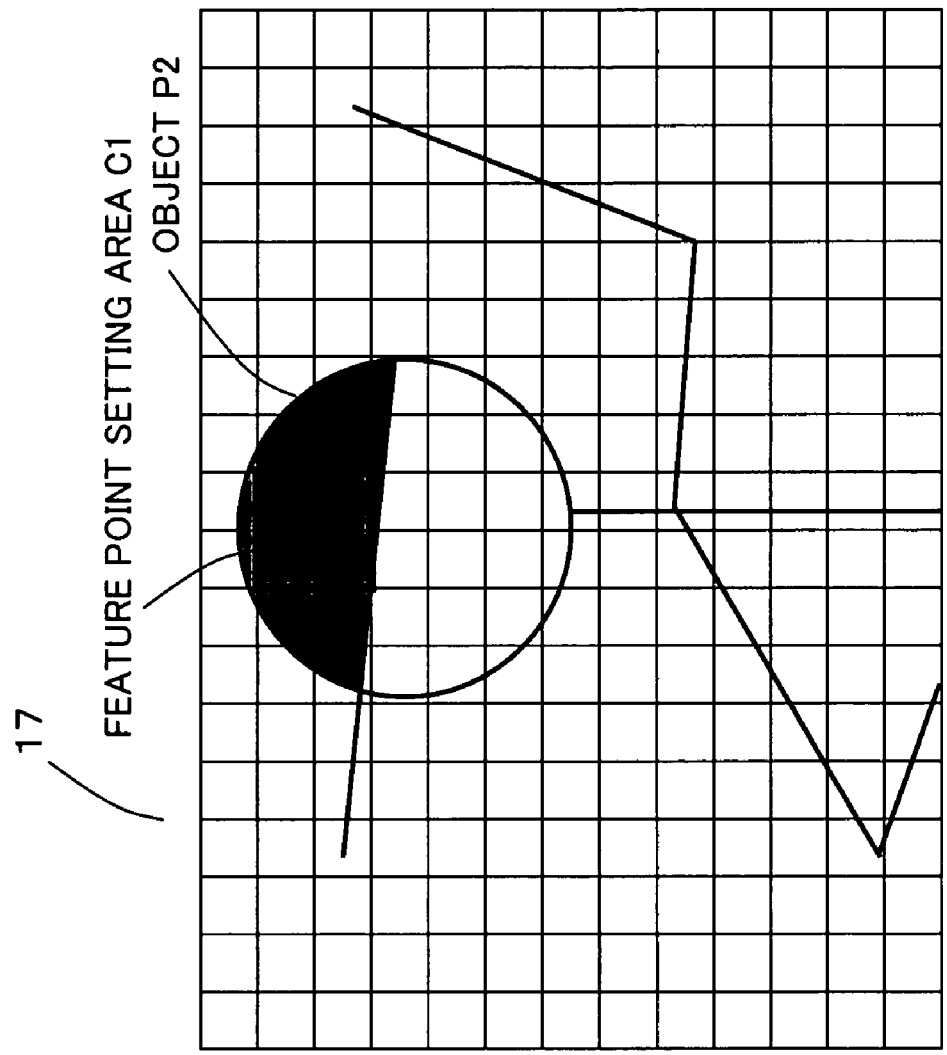
FIG. 6 is a diagram illustrating a schematic view of the display section 17, on which the object in the embodiment 1 of the present invention and the area frames are displayed.

FIG. 4 is a flowchart showing operations of the imaging device in the feature point information setting processing. The flowchart in FIG. 4 shows an operation flow of a program which is executed on the system controller 30. FIG. 5 is a diagram illustrating a schematic view of the display section 17 on which an object is displayed. FIG. 5 shows an example in which an object P2 is displayed on the display section 17. FIG. 6 is a diagram illustrating a schematic view of the display section 17, on which the object and the area frames are displayed, according to the embodiment 1 of the present invention. FIG. 6 shows an example in which 18×13 unit area frames are displayed on the object P2. If a mode in which color information is referred to is set by using the menu button 19d and the decision button 19c, the processing starts from a start of reference color information setting processing.

At step S101, an image signal which is captured by the CCD 14 is outputted from the image processing section 15 and a visible image is displayed on the display section 17. The unit area selection section 40 causes the display section 17 to display the unit area frames. Thereupon, as shown in FIG. 6, the image displayed on the display section 17 is in a display state where the visible image and the unit area frames are overlaid. The image signal inputted from the image memory 16 to the image segmentation section 31 in the system controller 30 is segmented for each of the unit areas.

At step S102, an input as to whether a feature point setting area C1 is selected is waited. The feature point setting area C1 is used for setting a feature point. The AF area selection section 37 outputs display positional information indicating a range of the feature point setting area C1 to the display section 17, and causes the display section 17 to display the feature point setting area frame. Thereupon, a specific area (feature point setting area C1) being enclosed with a solid frame is displayed, thereby indicating that selection is possible. The user can move the area being enclosed with the solid frame by using the cursor key 19b. For example, when the user moves the area being enclosed with the solid frame and presses the decision button 19c, the feature point setting area C1 shown in FIG. 6 is selected, thereafter proceeding to a process at step S103.

At step S103, the feature point extraction section 34 calculates color information of segmented image displayed in the feature point setting area C1, thereafter proceeding to a process at step S104.

At step S104, the feature point information setting section 41 stores the calculated color information, whereby the feature point information setting processing is completed.

FIG. 7 shows operation expressions for hue and saturation information in the embodiment 1. Hereinafter, a principle in the operations of the hue and saturation information by the feature point extraction section 34 mentioned at step S103 will be described. Assuming that the image signal is divided into red (herein after, referred to as R), green (herein after, referred to as G), and blue (herein after, referred to as B) and that R, G, and B each have 256 levels, descriptions will be given.

The operations of the hue and saturation information are performed by the feature point extraction section 34. First, the feature point extraction section 34 obtains a maximum value among R, G, and B with respect to an image signal which is outputted from the image segmentation section 31 and segmented (herein after, referred to as a segmented image signal). The obtained maximum value is represented as V (expression 1). Next, the feature point extraction section 34 obtains a minimum value with respect to the segmented image signal outputted from the image segmentation section 31 and subtracts the obtained minimum value from V, whereby d is obtained (expression 2). Further, the feature point extraction section 34 obtains a saturation S by using V and d (expression 3).

When the saturation S=0 is satisfied, the feature point extraction section 34 determines a hue H=0 (expression 4). When the saturation is a value other than 0, the feature point extraction section 34 calculates the hue by performing a predetermined process (expressions 5 to 7). Here, the predetermined process is either one of processes: a process of obtaining the hue H in accordance with the expression 5 when a maximum value among R, G, and B is equal to R; a process of obtaining the hue H in accordance with the expression 6 when the maximum value is equal to G; a process of obtaining the hue H in accordance with the expression 7 when the maximum value is equal to B.

Finally, when the obtained hue H is a negative value, the feature point extraction section 34 converts the hue H into a positive value by adding 360 (expression 8). As described above, the feature point extraction section 34 calculates the hue and saturation information of the segmented image signal.

Figure 8:
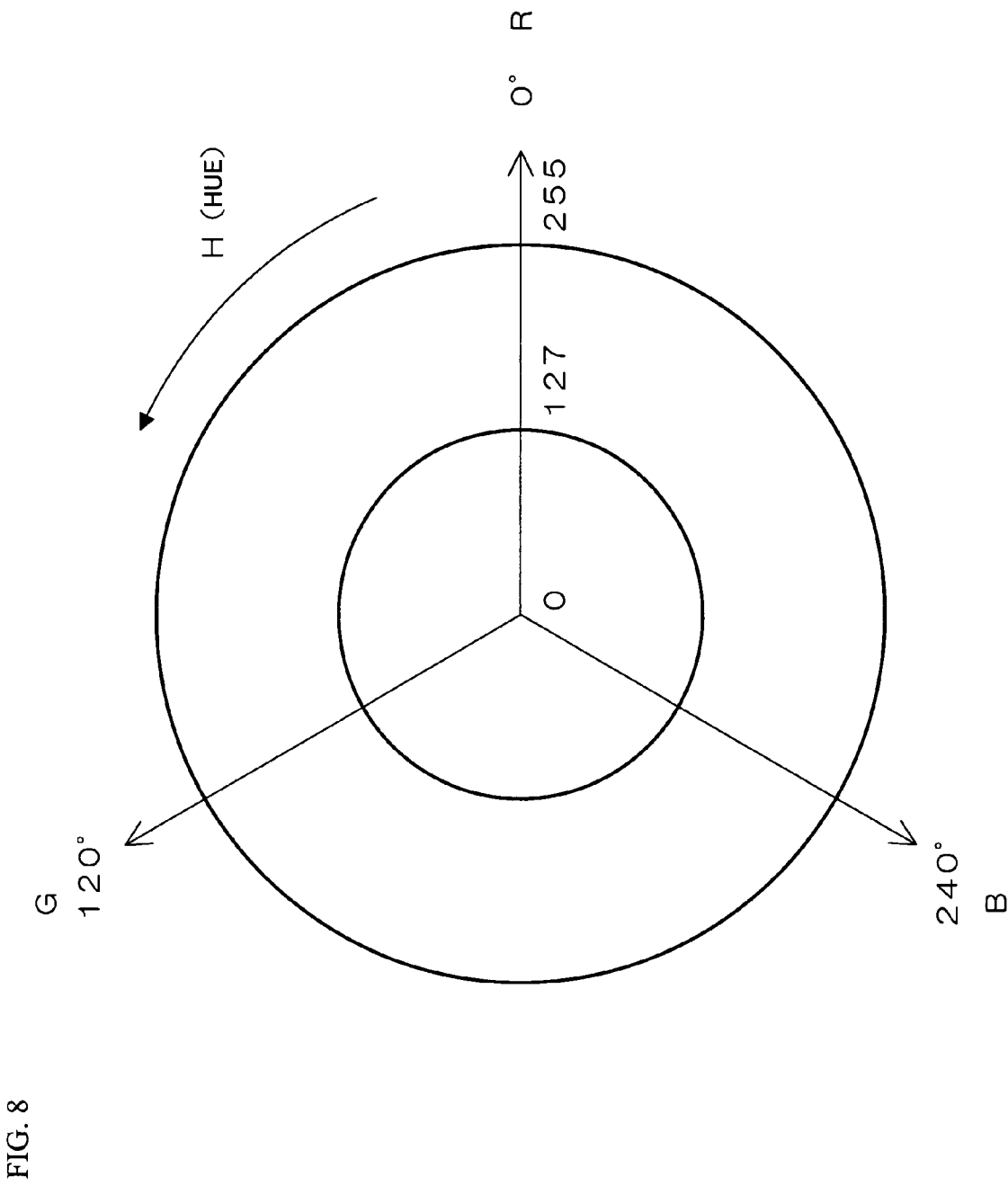
FIG. 8 is a chart diagram of the hue and saturation information in the embodiment 1.

FIG. 8 is a chart diagram of the hue and saturation information in the embodiment 1. In FIG. 8, the saturation S corresponds to a radius direction of the chart and is plotted so as to increase from a center, representing S=0, to periphery, within a range of 0 to 255. And in FIG. 8, the hue H corresponds to a circumferential direction and is represented by a value from 0 to 359 along the circumferential direction.

For example, if color information of the segmented image signal indicates R=250, G=180, and B=120, the feature point extraction section 34 can obtain V=250, d=250−120=130, saturation S=130×255/250=133, and hue H=(180−120)×60/133=27 by using the above-mentioned expressions.

As described above, the feature point extraction section 34 calculates a saturation and a hue of the segmented image signal. Reference color information containing the calculated saturation and hue is, as feature point information, outputted to and stored in the feature point information setting section 41. Next, a reference vicinity region which is set so as to be adjacent to the reference color information will be described.

The reference color information calculated by the feature point extraction section 34 is stored in the feature point information setting section 41, and used as reference, which is referred to as needed, for judging color information of an object to be shot. In the meantime, in general, color information of the same object slightly changes depending on factors such as illumination light and exposure time. Accordingly, when the reference color information and the color information of the object to be shot are compared, it is preferable that a predetermined permissible range is given to the reference color information to make identity judgment. The constant permissible range of this reference color information is referred to as a reference vicinity region.

Figure 9:
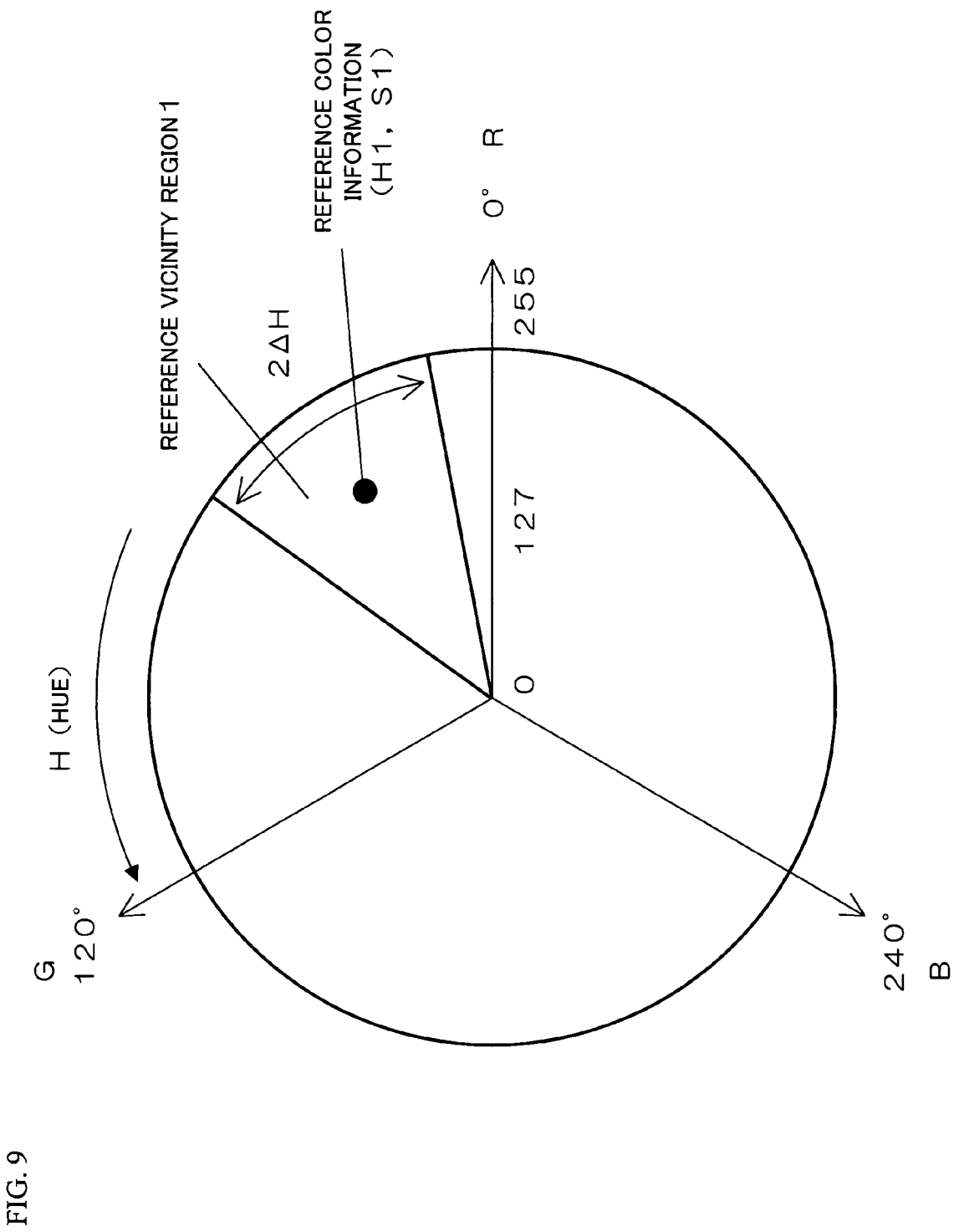
FIG. 9 is a chart diagram of the hue and saturation information, which shows reference color information in the embodiment 1 and a reference vicinity region 1.

Hereinafter, an example in which the reference vicinity region is calculated is shown. FIG. 9 is a chart diagram of the hue and saturation information, which shows the reference color information in the embodiment 1 and a reference vicinity region 1. In FIG. 9, a point which is plotted as reference color information (H1, S1) corresponds to the color information stored in the feature point information setting section 41. The reference color information indicates the hue H=27 (=H1) and the saturation S=130 (=S1), which are obtained when R=250, G=180, and B=120, calculated in the above-mentioned example, are satisfied.

The reference vicinity region 1 is a region in which a permissible range is defined with respect to the reference color information H1. In a case of a permissible range of the hue ΔH=10, the reference vicinity region 1 corresponds to a region of H1±10, which is enclosed by one arc and two lines in a radius direction as shown in FIG. 9.

Although in the above-described example, a permissible range of the hue is set in a uniform manner, the present invention is not limited thereto. In a case where an auxiliary light source is used, by adjusting a range of color information to be referred based on hue information of the light source, it is made possible to accurately specifying a reference range even when an imaging device is used in a dark place. For example, in a case where a reddish auxiliary light source having an LED or the like is used, adjustment is enabled by shifting H1 toward 0.

Figure 10:
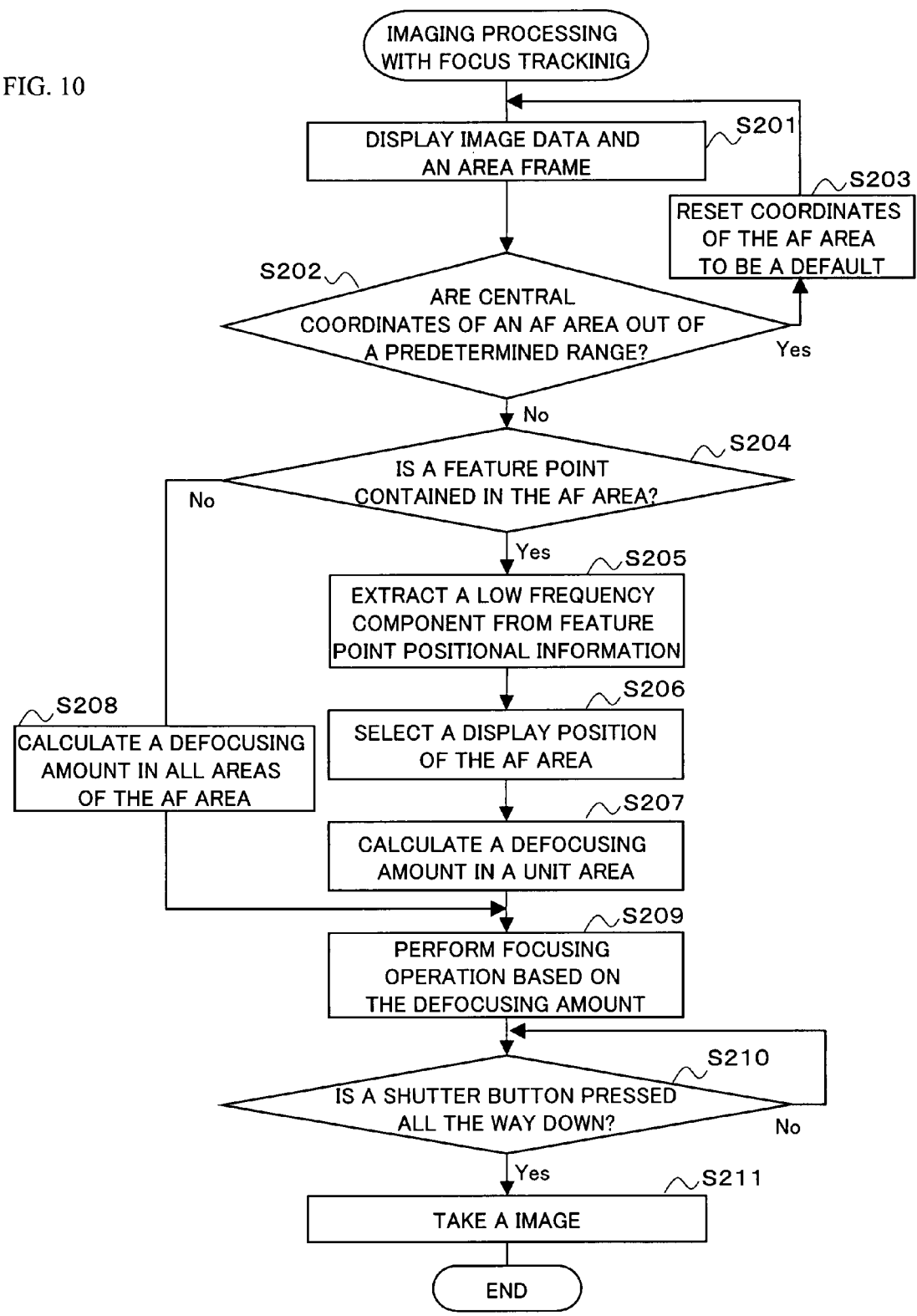
FIG. 10 is a flowchart showing operations of the imaging device in imaging processing with focus tracking.

Next, a focus tracking operation will be described. FIG. 10 is a flowchart showing operations of the imaging device in the imaging processing with focus tracking. The flowchart in FIG. 10 shows an operation flow of a program which is executed by the system controller 30. And FIGS. 11A to 11D are schematic diagrams of the display section 17 in the embodiment 1, on which an object and an AF area frame are displayed. In FIGS. 11A to 11D, shown is an example in which the object P1. 18×13 unit area frames, and the AF area frame (area A1) are displayed. Each of FIGS. 11A to 11D, shows a view in which the object P1 moves on the display section 17 each time 1/30 second passes. In accordance with the movement, a unit area frame containing a feature point of the object, which is extracted by the feature point extraction section 34, moves in the order of an area B1a, an area B1b, an area B1c, and an area B1d. In FIG. 10, when the shutter button 19a is pressed by a user halfway down, the imaging processing with focus tracking is started.

Figure 11A:
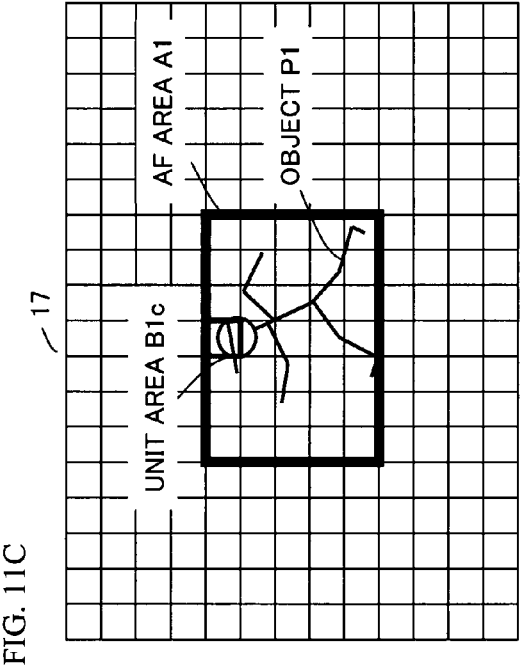
FIG. 11A is a schematic diagram of the display section 17 in the embodiment 1, on which an object and an AF area frame are displayed.
Figure 11B:
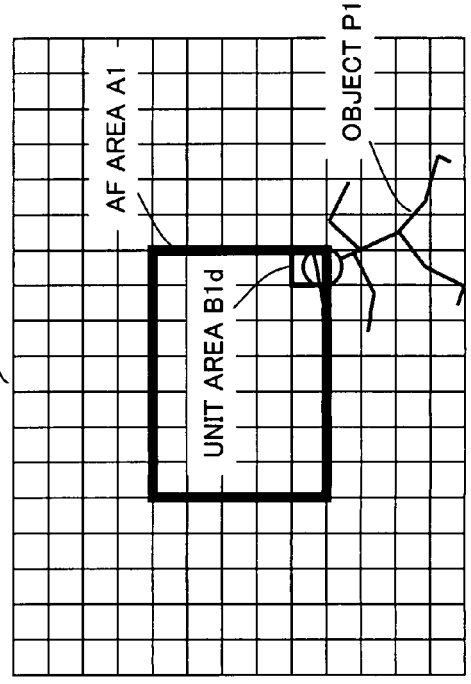
FIG. 11B is a schematic diagram of the display section 17 in the embodiment 1, on which the object and the AF area frame are displayed.
Figure 11C:
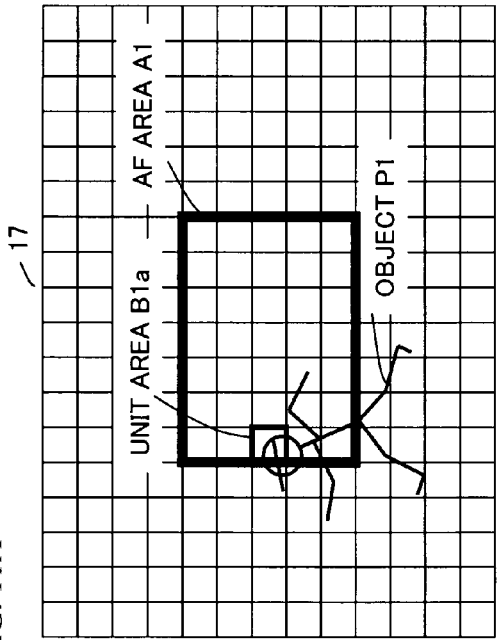
FIG. 11C is a schematic diagram of the display section 17 in the embodiment 1, on which the object and the AF area frame are displayed.
Figure 11D:
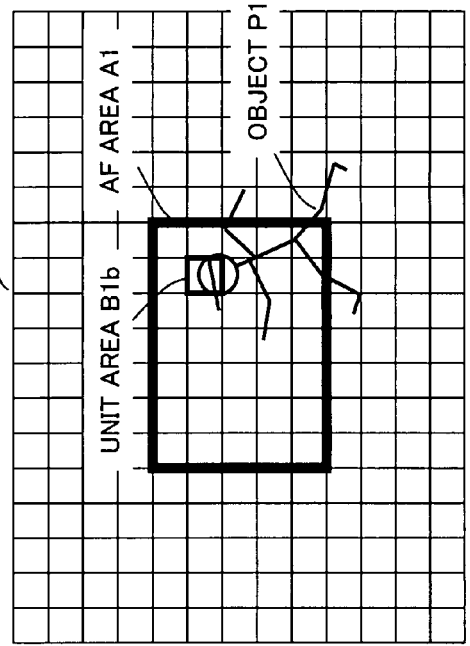
FIG. 11D is a schematic diagram of the display section 17 in the embodiment 1, on which the object and the AF area frame are displayed.

At step S201, the display section 17 displays a visible image and the AF area frame. Specifically, the display section 17 displays the visible image of an image signal which is captured by the CCD 14 and subjected to predetermined image processing by the image processing section 15. And the image signal is segmented into 18×13 unit areas by the image segmentation section 31 and the AF area A1 is formed by 7×5 unit areas among the segmented unit areas. The AF area frame enclosing the AF area A1 is displayed being overlaid on the image signal. Thereupon, as shown in FIG. 11A, the display section 17 is in a display state in which the visible image and the AF area frame are overlaid. Although in FIG. 11A, the unit area frames are also displayed, the unit area frame may not be displayed.

Next, at step S202, it is determined whether center coordinates of the AF area A1 are out of a predetermined range of the display section 17. When the center coordinates of the AF area A1 are out of the predetermined range, the AF area frame is displayed near a periphery of the screen. The predetermined range is, for example, a range which includes coordinates in vicinity to a central portion of the display section 17 and for example, is formed by an area connecting coordinates (3, 2), (14, 2), (14, 10), and (3, 10).

At step S203, when the center coordinates of the AF area A1 are out of the predetermined range, the center coordinates of the AF area A1 are reset to a default. Here, the center coordinates of the AF area A1 are moved to coordinates (8, 6), which are center coordinates of the display section 17 as shown in FIG. 4, and displayed on the display section 17. Again at step S201, the display section 17 displays the visible image and the AF area frame. On the other hand, when the center coordinates of the AF area A1 are within a predetermined range, the processing proceeds to step S204.

At step S204, the unit area selection section 40 determines whether a feature point is contained in the AF area A1. Specifically, based on the reference color information stored in the feature point information setting section 41, a reference vicinity region is calculated by the method described above with reference to FIG. 9 and it is determined whether color information of each area, which is outputted from the feature point extraction section 34, is contained in the reference vicinity region. When the feature point is contained in the AF area A1, that is to say, when an area having color information close to the reference color information, which is feature point information, is in the AF area A1, the processing proceeds to step S205. On the other hand, when the feature point is not contained in the AF area A1, that is to say, when an area having color information close to the reference color information is not in the AF area A1, the processing proceeds to step S208.

The image segmentation section 31 outputs the image signal, which has been segmented for 18×13 unit areas, to the feature point extraction section 34 and the focusing information calculation section 32. Based on the display positional information outputted from the AF area selection section 37, the feature point extraction section 34 calculates color information, as a feature point, of each of the unit areas which is included in the range of the AF area A1, among the unit areas into which the image signal has been segmented.

In FIG. 11A, the area B1a which is extracted as a feature point is represented as coordinates (5, 6). In subsequent FIG. 11B, the area B1b, which is extracted as a feature point, is represented as coordinates (10, 5). In subsequent FIG. 11C, the area B1c, which is extracted as a feature point, is represented as coordinates (8, 4). In subsequent FIG. 11D, the area B1d, which is extracted as a feature point, is represented as coordinates (11, 8).

Figure 12:
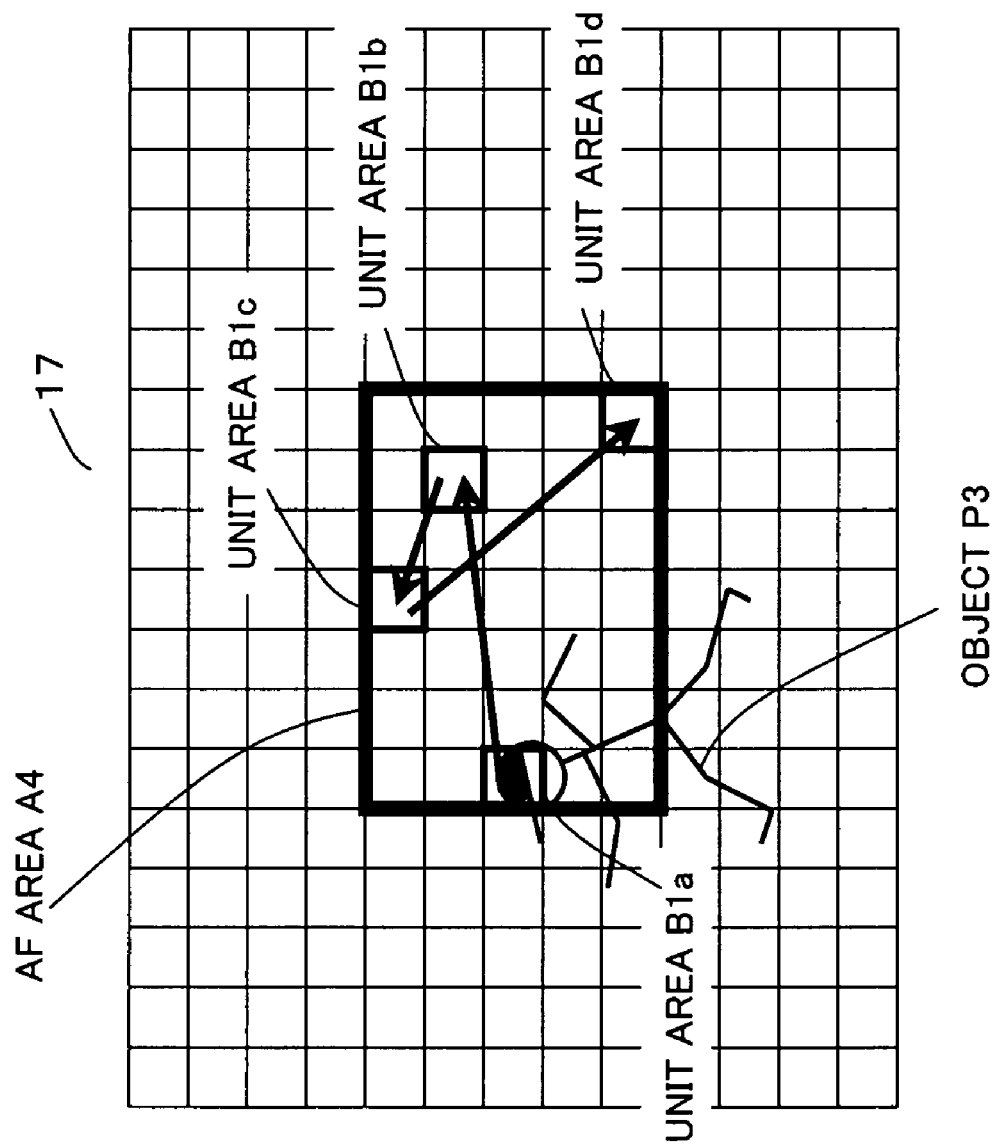
FIG. 12 is a schematic diagram illustrating movements among unit areas B1a to B1d in FIGS. 11A to 11D.

FIG. 12 is a schematic diagram illustrating a view of movement of the unit areas B1a to B1d. When the object moves as shown in FIG. 11A, FIG. 11B, FIG. 11C, and FIG. 11D in order, the unit area frame from which the feature point is extracted moves in the order shown in FIG. 12. Hereinafter, a case where the display section 17 is in a state shown in FIG. 11D will be described as an example.

Next, at step S205, a low frequency component is extracted from the feature point positional information. The low pass filter 36 calculates an average between the coordinates of a current feature point (the coordinates of the area B1d) and the coordinates of a previous feature point (the coordinates of the area B1c) among the selected unit areas (the areas B1a to B1d) and outputs the average as extracted positional information.

Subsequently, at step S206, a display position of the AF area A1 is selected based on the extracted positional information. The AF area selection section 37 selects the display position of the AF area A1, outputs the display positional information, and causes the display section 17 to display the AF area frame A1.

Next, at step S207, a defocusing amount in the unit area (the area B1d) selected by the unit area selection section 40 is calculated. Specifically, the focusing information calculation section 32 calculates a contrast using the image signal of each unit area selected by the unit area selection section 40 and calculates the defocusing amount in relation to a position where the contrast reaches a peak. More specifically, the focusing information calculation section 32 sends an instruction of calculating the defocusing amount to the lens position control section 33. The lens position control section 33 causes the lens driving section 21 to drive the focus lens 13 in an A or B direction and sends positional information of the focus lens 13 to the focusing information calculation section 32. By using the positional information of the focus lens 13 and the contrast information calculated using the image signal, the defocusing amount is calculated based on a position of the focus lens, where a contrast value is the highest, and a current position.

Next, focusing is performed in the unit area (for example, the area B1d) selected at step S207. Specifically, the defocusing amount calculated by the focusing information calculation section 32 is sent to the lens position control section 33. Based on the defocusing amount, the lens position control section 33 causes the lens driving section 21 to drive the focus lens 13 and performs the focusing on the object. And the processing proceeds to step S209.

On the other hand, when it is determined at step S204 that a feature point is not in the AF area (area A1), the focusing information calculation section 32, the lens position control section 33, and the lens driving section 21 drive the focus lens 13 in the A or B direction shown in FIG. 1 at step S208, whereby the focusing information calculation section 32 calculates a position of the focus lens 13 where the contrast value is the highest for all the areas in the AF area, in accordance with the positional information of the focus lens and a contrast signal generated from the image signal. The defocusing amount is calculated based on the position of the focus lens 13, where this contrast value is the highest, and the current position.

At step S209, based on the defocusing amount obtained by the focusing information calculation section 32 in the process at step S207 or step S208, the lens position control section 33 and the lens driving section 21 causes the focus lens 13 to focus on the selected area. Next, the processing proceeds to step S210. At step S208, among the defocusing amounts obtained for all the areas in the area A1, a defocusing amount of the closest area may be selected and focusing may be performed in the closest area at step S209, or a defocusing amount of an area near a central portion, to which a priority is given, may be selected and the focusing may be performed in the area near the central portion at step S209.

Next, it is determined at step S210 whether the shutter button 19a is pressed all the way down. When the shutter button 19a is pressed all the way down, the processing proceeds to step S211. If the shutter button 19a is released, all the above-mentioned processing is to be redone. At step S211, based on an instruction from the system controller 30 at the timing when the shutter button 19a is pressed all the way down, imaging processing in which an image signal outputted from the image memory 16 or the image processing section 15 is stored in the memory card is performed, and the imaging processing with focus tracking is completed.

Next, a method of controlling a display position of the AF area, which is a feature of the present invention, will be described.

Figure 13:
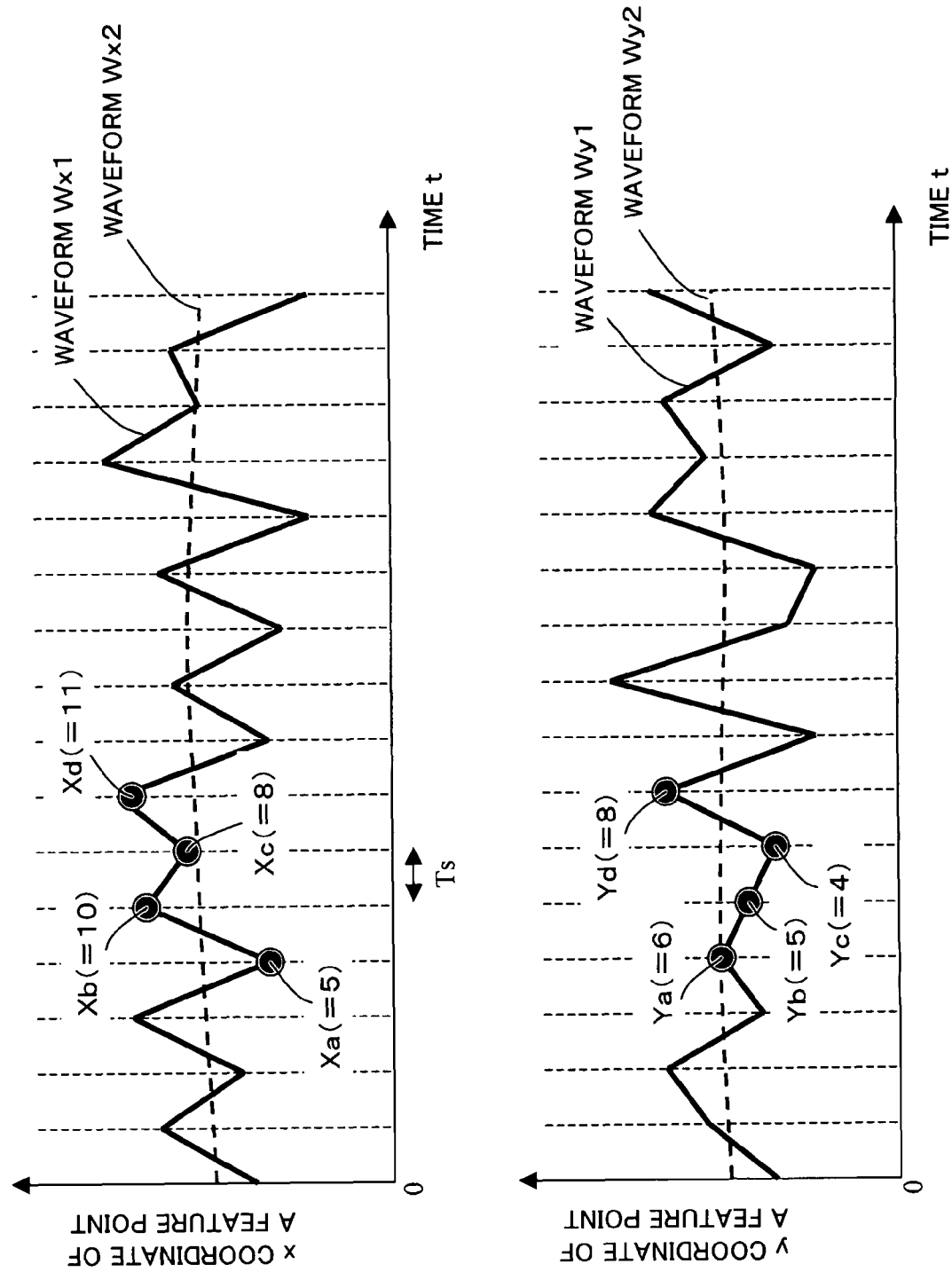
FIG. 13 is a diagram showing coordinates of a feature point, which are calculated by a feature point position calculation section.

FIG. 13 is a diagram showing coordinates of a feature point, which are calculated by the feature point position calculation section 35. A graph shown in an upper row in FIG. 13 is a graph showing time-series movement of the unit area containing the feature point in x direction. In the graph, a vertical axis indicates x coordinate of the unit area containing the feature point on the display section 17 and a horizontal axis indicates time t. A waveform Wx1 represents time-series movement of a position in the x direction, indicated by the feature point positional information outputted from the feature point position calculation section 35. A waveform Wx2 represents time-series movement of a position in the x direction, indicated by the feature point positional information outputted from the low pass filter 36. As shown, by extracting low frequency components of the waveform Wx1, the waveform having a smaller fluctuation than that of the waveform Wx1 can be generated.

On the other hand, a graph shown in a lower row in FIG. 13 is a graph showing time-series movement of the unit area containing the feature point in y direction. In the graph, a vertical axis indicates y coordinate of the unit area containing the feature point on the display section 17 and a horizontal axis indicates time t. A waveform Wy1 represents time-series movement of a position in the y direction, indicated by the feature point positional information outputted from the feature point position calculation section 35. A waveform Wy2 represents time-series movement of a position in the y direction, indicated by the feature point positional information outputted from the low pass filter 36. As described above, by extracting low frequency components of the waveform Wy1, the waveform having a smaller fluctuation than that of the waveform Wy1 can be generated.

In the two graphs shown in FIG. 13, the feature point positional information of the unit area is plotted at periodic intervals Ts to perform the focusing information calculation processing or the feature point extraction processing. For example, in a case where movement of the feature point of the object shown in FIG. 11 is represented by coordinates, the feature point moves as shown in FIG. 11A, FIG. 11B, FIG. 11C, and FIG. 11D in order. Thereupon, x coordinates are represented as Xa (=5), Xb (=10), Xc (=8), and Xd (=11) and y coordinates are represented as Ya (=6), Yb (=5), Yc (=4), and Yd (=8).

Figure 14B:
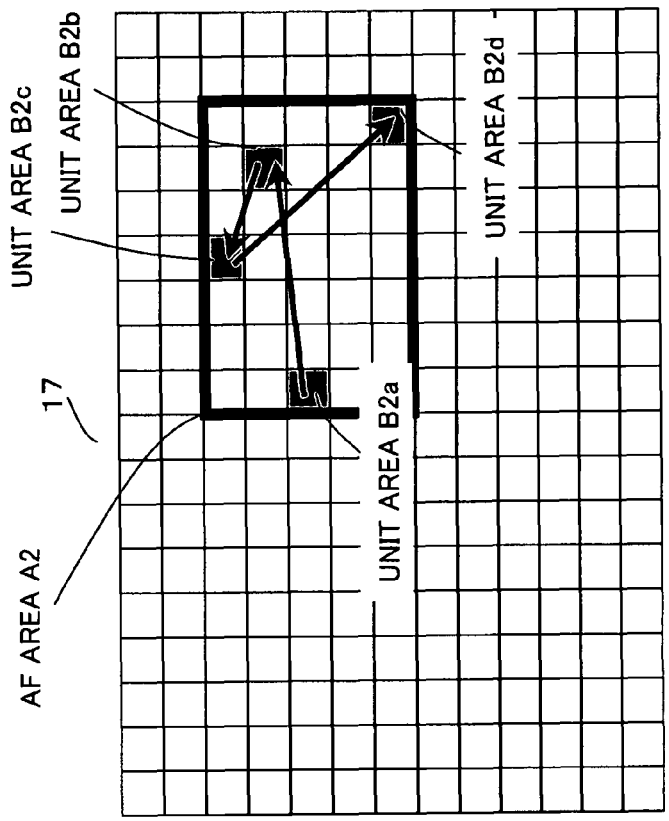
FIG. 14B is a diagram showing coordinate relationships between the display area frame displayed on the display section 17 and the feature point.
Figure 14A:
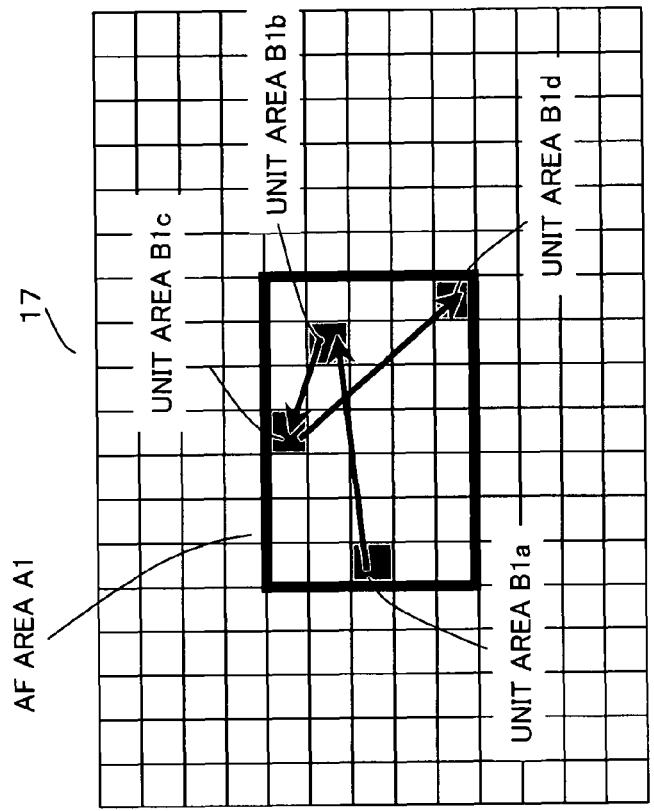
FIG. 14A is a diagram showing coordinate relationships between a display area framed is played on the display section 17 and a feature point.

FIGS. 14A to 14D are schematic diagrams of the display section 17 on which an AF area frame and unit area frames are displayed. As shown in FIG. 14A, coordinates of the feature point of the object, which is described with reference to FIGS. 11 and 13, greatly change in the order of an area B1$a$, an area B1$b$, an area B1$c$, and an area B1$d$. In a case where only a unit area from which the feature point is extracted is displayed, for example, if an image to be displayed on the display section is updated at periodic intervals Ts of 1/30 second, per which the focusing information calculation processing or the feature point extraction processing is performed, a position of the unit area to be displayed moves per 1/30 second, thereby resulting in a hard-to-see image.

By contrast, the imaging device according to the present invention displays the AF area (area A1) which is set so as to include one or more unit areas, not displaying only a unit area (among the areas B1$a$ to B1$d$) from which the feature point of the object is extracted. Specifically, a central position of an area A1 having a predetermined size (here, a size in which 7×5 unit areas are included) is set in accordance with respective low frequency components of x coordinate and y coordinate of an area containing the feature point, which is outputted from the low pass filter 36, and then the central position is displayed on the display section 17. Thus, as shown in FIG. 14A, even if the position of the feature point of the object moves in a jiggling manner in the order of B1$a$, B1$b$, B1$c$, and B1$d$, the AF area (area A1) can be displayed at a stable position.

In addition, as shown in FIG. 14B, when the feature point of the object is at the upper right on the display section 17, the area A2 is set so as to include these areas and is displayed instead of the unit area itself (among the areas B2$a$ to B2$d$) from which the feature point of the object is extracted. Accordingly, when the body of the imaging device is panned in a lower left direction in a state where the AF area is displayed at a central position on the display section 17 (in a state shown in FIG. 14A), the AF area displayed on the display section 17 slowly moves in an upper right direction and the state shown in FIG. 14A changes to the state shown in FIG. 14B. Thus, following the object can be explicitly indicated and the AF area can be displayed in an easily viewable manner.

As described above, according to the present embodiment, since the position of the displayed AF area does not move in a jiggling manner, it is possible to provide the imaging device which has high operability and is capable of displaying a range, where the object is captured, on the screen in an easily viewable manner. Since control information is calculated with respect to the AF area having a necessity minimum and optimum size, a load in arithmetic processing is reduced. Accordingly, the functionality of the imaging device can be enhanced. Since the color information of the object, which is used as the feature point, can be arbitrarily set by a user, the functionality of the imaging device can be further enhanced.

Further, according to the present embodiment, when the center coordinates of the AF area are out of the predetermined range, the center coordinates of the AF area are reset to be a default, thereby shifting the AF area frame to the vicinity of a central portion of the screen. In a case where the imaging device is a digital still camera or a digital video camera, when the object shifts to a periphery of the screen, a user generally changes a direction of the imaging device such that the object can be displayed near the central portion of the screen. Accordingly, when the center coordinates of the AF area are out of the predetermined range, by resetting the center coordinates of the AF area to be a default, the display position of the AF area can be quickly shifted to the vicinity of the central portion of the screen.

In the embodiment 1, although the example in which the image segmentation section segments the image signal into the 18×13 unit areas and the 18×13 unit area frames are displayed on the display section 17 is described, it is arbitrary to set the number of the unit areas, allowing the unit areas to be set in an appropriate manner. A number of the unit areas may be combined to be one unit area. In such a case, a plurality of the unit areas may be overlapped on one another.

In the embodiment 1, although the example in which the feature point information in the 2×2 area frames is calculated and stored is described, it is arbitrary to set a size and a position of the area frames.

In the embodiment 1, although the example in which the color information of the imaged object is stored in the feature point information setting section 41 is described, the present invention is not limited thereto. For example, a number of pieces of reference color information, such as color of skin, may be stored as the feature point information in the body of the imaging device. In such a case, the feature point information is previously stored in a storage device such as a memory which the imaging device includes. When extracting the feature point, the feature point extraction section 34 extracts the feature point based on the feature point information previously stored in the memory. In such a case, the feature point information-setting section 41 may not be included in the imaging device.

In the embodiment 1, although the example in which the frame enclosing the AF area used for the focus tracking is displayed as the AF area frame is described, the area used for the imaging processing with focus tracking and the displayed area may not necessarily match with each other. For example, the focusing information calculation processing and the feature point extraction processing may be performed with respect to not only the AF area but also all the areas. In order to ensure viewability of the screen by preventing the position of the AF area frame from moving in a jiggling manner, it is preferable that the size of the displayed AF area frame is larger than the size of the area in which the focusing information is calculated.

In the embodiment 1, although the example in which the position of the AF area, which is first displayed at a start of the focus tracking processing, and the position of the AF area, which is displayed when the center coordinates thereof are out of the predetermined range, are near the central portion of the screen, the display position of the default of the AF area is not limited thereto. For example, it is often the case that in a surveillance camera or the like, an object appears on a periphery of a screen thereof. Accordingly, in such a case, the display position of the default of the AF area may be on the periphery of the screen.

Embodiment 2

In the embodiment 1, the imaging device uses the color information when extracting the feature point. In contrast to this, an imaging device according to the present embodiment has a feature in that information pertinent to luminance is used when extracting the feature point.

Figure 15:
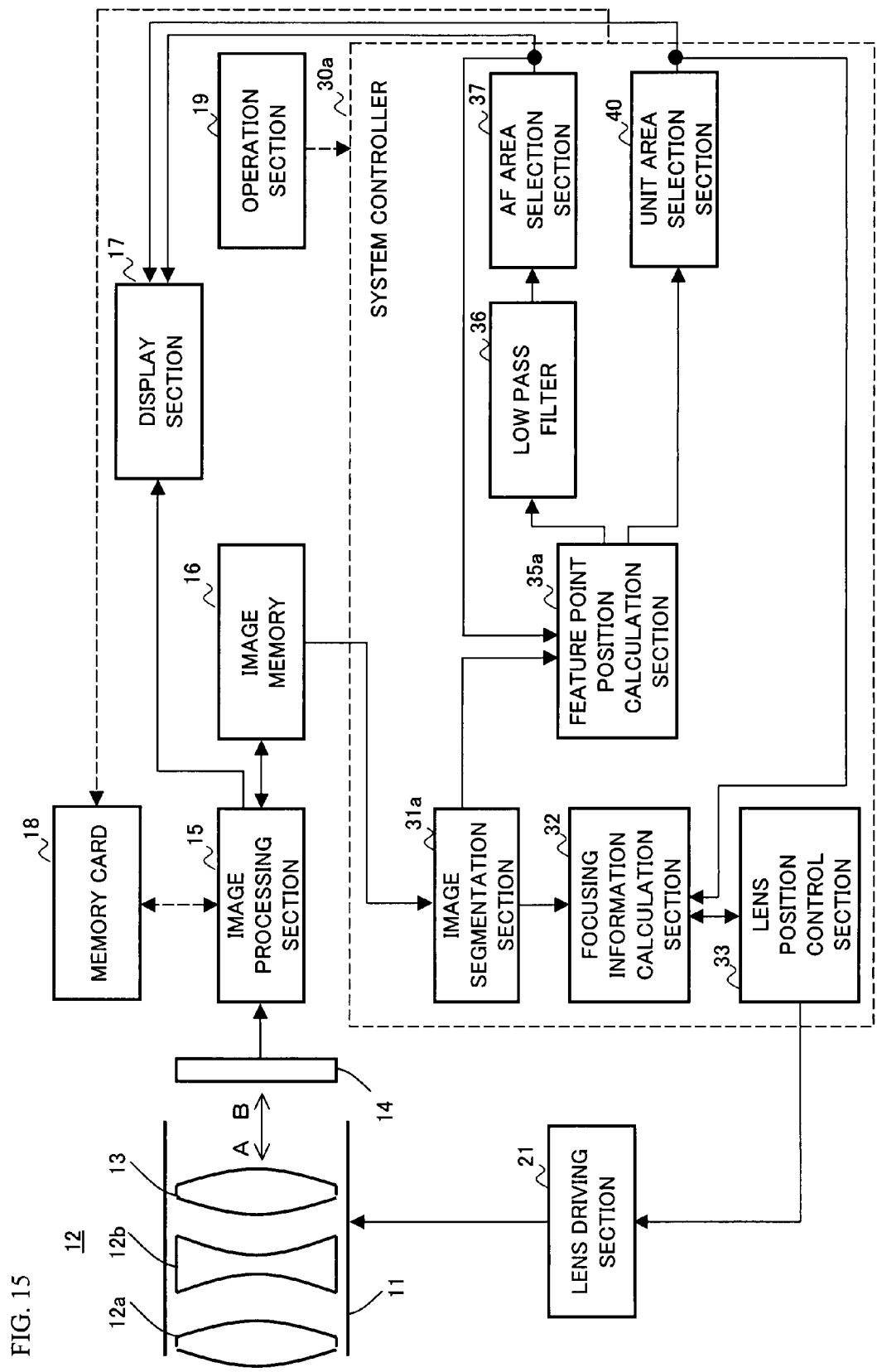
FIG. 15 is a block diagram illustrating a configuration of an imaging device according to an embodiment 2 of the present invention.

FIG. 15 is a block diagram illustrating a configuration of the imaging device according to the embodiment 2 of the present invention. Since the imaging device according to the embodiment 2 has substantially the same configuration as that of the imaging device according to the embodiment 1, the same reference signs as those in FIG. 1 are used to denote components which function in a manner similar to the manner in which the components shown in FIG. 1 function, and detailed descriptions will be omitted.

The system controller 30a shown in FIG. 15 is different from the system controller 30, which is shown in FIG. 1 and is included in the imaging device of the embodiment 1, in that the feature point extraction section 34 and the feature point information setting section 41 are omitted. In the system controller 30a shown in FIG. 15, operations of an image segmentation section and a feature point position calculation section are different from those in the embodiment 1. Therefore, in order to differentiate the image segmentation section and the feature point position calculation section in the present embodiment from the image segmentation section 31 and the feature point position calculation section 35 in the embodiment 1, the image segmentation section and the feature point position calculation section in the present embodiment are referred to as an image segmentation section 31a and a feature point position calculation section 35a, respectively.

The image segmentation section 31a outputs, to a focusing information calculation section 32 and the feature point position calculation section 35a, an image signal which is segmented into unit areas.

The feature point position calculation section 35a, using the image signal which has been segmented into a plurality of unit areas by the image segmentation section 31a, calculates a position of a feature point based on the information pertinent to the luminance of the respective unit areas (hereinafter, referred to as luminance information). Specifically, the feature point position calculation section 35a determines whether or not there is a luminance value, which varies over time, among luminance values indicated by the luminance information. The feature point position calculation section 35a compares a luminance value of the image signal at predetermined timing with a luminance value of the image signal at timing when a predetermined time period has passed from the predetermined timing. When a difference between the luminance values is larger than a predetermined threshold value, it is determined that a luminance value has changed. The feature point position calculation section 35a determines that a position at which the luminance value has changed is a position where the feature point is present, and outputs, to a low pass filter 36 and a unit area selection section 40, the feature point positional information obtained by the calculation.

In the present embodiment, since operations of the imaging device in imaging processing with focus tracking are the same as those of the imaging device of the embodiment 1 except that the luminance information is used when extracting the feature point, FIG. 10 is applied to the present embodiment and descriptions will be omitted.

As described above, according to the present embodiment, focus tracking of an object can be realized by using the luminance information. In the present embodiment, although the position at which the luminance value has changed is extracted as the feature point, a method of extracting the feature point using the luminance value is not limited thereto. For example, a specific luminance value or a luminance value greater than or equal to a predetermined value may be previously set as a feature point. In such a case, the specific luminance value or the luminance value greater than or equal to the predetermined value are previously stored in a memory. The feature point position calculation section reads out the luminance value stored in the memory and performs feature point extraction processing. This is particularly effective when the imaging device is, for example, an installed camera such as a surveillance camera and a background to be displayed is substantially fixed.

Embodiment 3

In the embodiment 1, the imaging device uses the color information when extracting the feature point. In contrast to this, an imaging device according to the present embodiment has a feature in that motion vectors are used when extracting the feature point.

Since a configuration of the imaging device according to the present embodiment is the same as that of the imaging device according to the embodiment 2, FIG. 15 is applied to the present embodiment.

A feature point position calculation section 35a, using an image signal which has been segmented into a plurality of unit areas by an image segmentation section 31a, detects motion vectors of an object (feature point) in x direction and y direction respectively, based on luminance values indicated by luminance information of respective unit areas. The feature point position calculation section 35a outputs, to a low pass filter 36 and a unit area selection section 40, the detected motion vectors as feature point information.

In the present embodiment, since operations of the imaging device in imaging processing with focus tracking are the same as those of the imaging device of the embodiment 1 except that the motion vectors are extracted as the feature point, FIG. 10 is utilized and descriptions will be omitted.

As described above, according to the present embodiment, focus tracking can be realized by using the motion vectors.

Embodiment 4

In the embodiment 1, the imaging device uses the color information when extracting the feature point. In contrast to this, an imaging device according to the present embodiment has a feature in that edge information is used when extracting the feature point.

Figure 16:
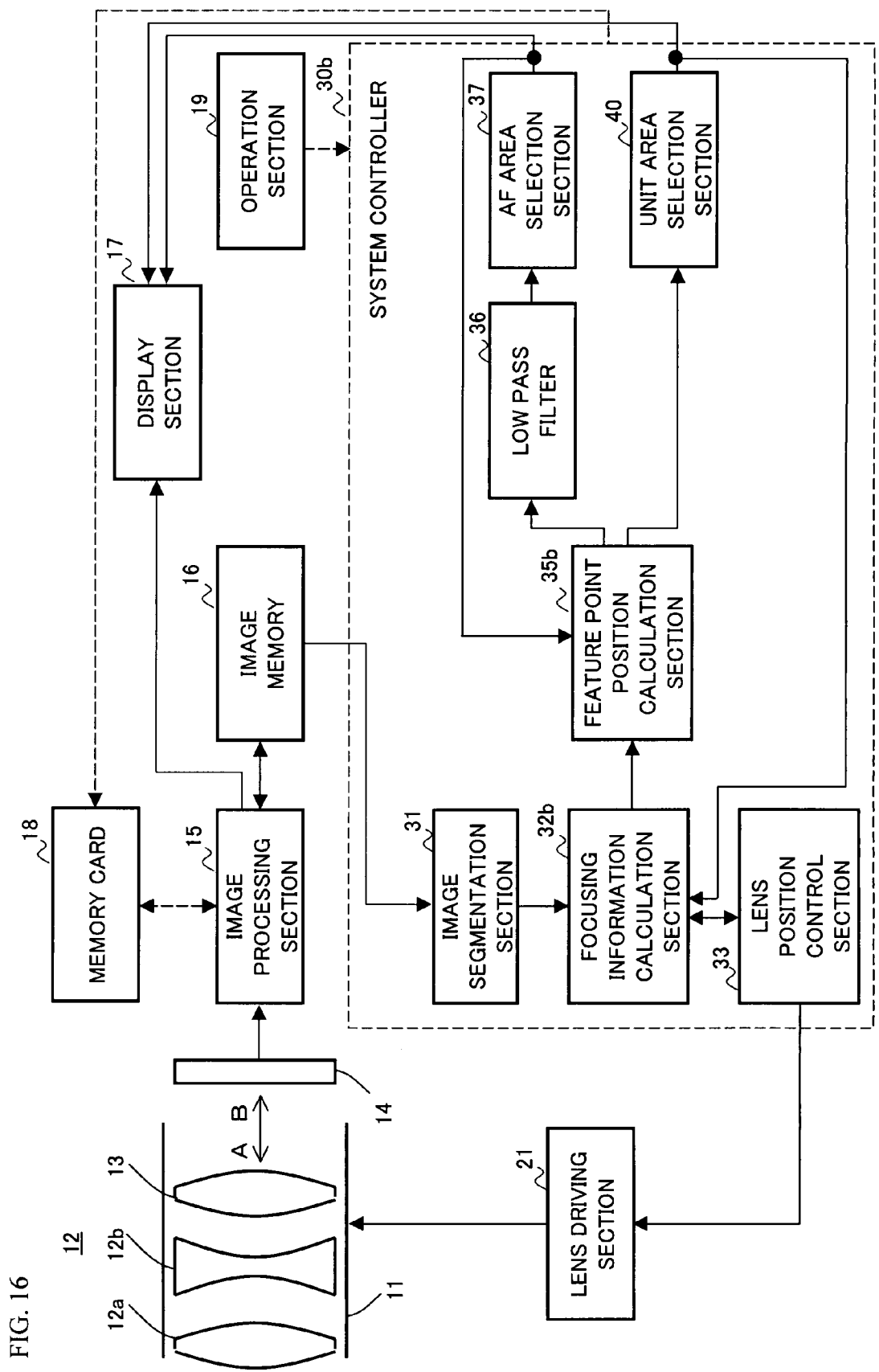
FIG. 16 is a block diagram illustrating a configuration of an imaging device according to an embodiment 4 of the present invention.

FIG. 16 is a block diagram illustrating a configuration of the imaging device according to the embodiment 4 of the present invention. Since the imaging device according to the present embodiment has substantially the same configuration as that of the imaging device according to the embodiment 1, the same reference signs as those in FIG. 1 are used to denote components which function in a manner similar to the manner in which the components shown in FIG. 1 function, and detailed descriptions will be omitted.

A system controller 30b shown in FIG. 16 is different from the system controller 30, which is shown in FIG. 1 and included in the imaging device of the embodiment 1, in that the feature point extraction section 34 and the feature point information setting section 41 are omitted. In the system controller 30b shown in FIG. 16, operations of a feature point position calculation section and a focusing information calculation section are different from those in the embodiment 1. Therefore, in order to differentiate the feature point position calculation section and the focusing information calculation section in the present embodiment from the feature point position calculation section 35 and the focusing information calculation section 32 in the embodiment 1, the feature point position calculation section and the focusing information calculation section in the present embodiment are referred to as a feature point position calculation section 35b and a focusing information calculation section 32b, respectively.

In the present embodiment, the focusing information calculation section 32b outputs contrast information of respective unit areas to the feature point position calculation section 35b.

The feature point position calculation section 35b, based on the contrast information outputted from the focusing information calculation section 32b, calculates a position where a feature point is present. Specifically, the feature point position calculation section 35b, based on the contrast information, generates the edge information, which is generated from a difference between contrasts of a background and an object and indicates contours of the object. As a method of generating the edge information, for example, there is a method in which binarization is performed through comparing luminance values and a method in which edge detection is performed using a differential filter. Instead of the above-mentioned methods, any other method for generating the edge information may be used.

The feature point position calculation section 35b compares edge information at predetermined timing and edge information at timing when a predetermined time period has passed from the predetermined timing, extracts a position of the moved edge as a feature point, and outputs, to a low pass filter 36 and a unit area selection section 40, the feature point positional information of the feature point obtained by the calculation.

In the present embodiment, since operations of the imaging device in imaging processing with focus tracking are the same as those of the imaging device of the embodiment 1 except that the edge information is extracted as the feature point, FIG. 10 is applied to the present embodiment and descriptions will be omitted.

As described above, according to the present embodiment, focus tracking can be realized by using the edge information.

Embodiment 5

In the embodiments 1 to 4, when the shutter button 19a is pressed by a user halfway down, the imaging device starts the imaging processing with focus tracking. In contrast to this, an imaging device according to the present embodiment has a feature in that when the shutter button is pressed halfway down and a focal length is greater than or equal to a predetermined value, the imaging device starts the imaging processing with focus tracking.

Figure 17:
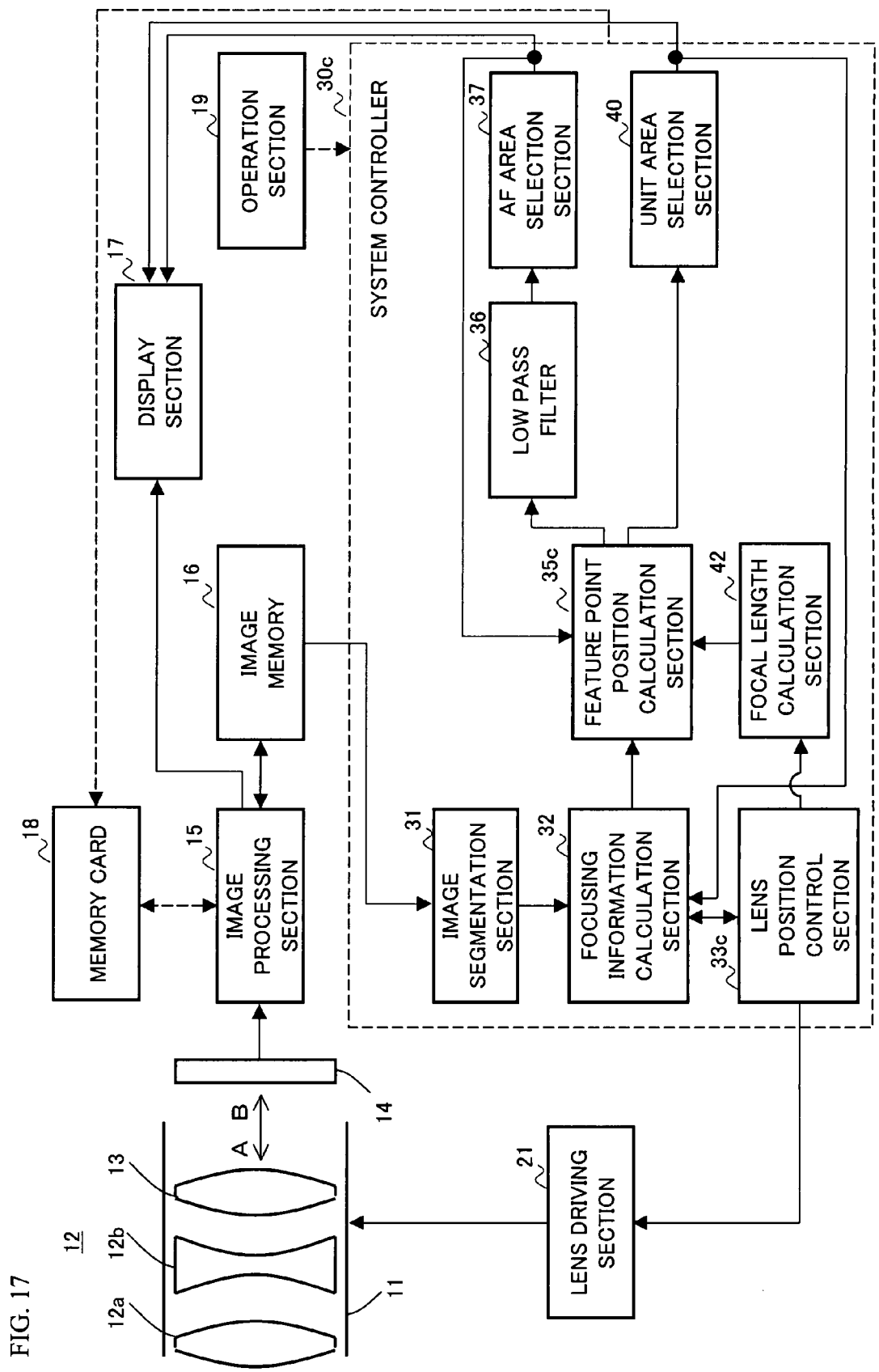
FIG. 17 is a block diagram illustrating a configuration of an imaging device according to an embodiment 5 of the present invention.

FIG. 17 is a block diagram illustrating a configuration of the imaging device according to the embodiment 5 of the present invention. Since the imaging device according to the embodiment 3 has substantially the same configuration as that of the imaging device according to the embodiment 1, the same reference signs as those in FIG. 1 are used to denote components which function in a manner similar to the manner in which the components shown in FIG. 1 function, and detailed descriptions will be omitted.

A system controller 30c shown in FIG. 17 is different from the system controller, which is shown in FIG. 1 and is included in the imaging device of the embodiment 1, in that a focal length calculation section 42 is further included. In the system controller 30c shown in FIG. 17, operations of a feature point position calculation section and a lens position control section are different from those in the embodiment 1. Therefore, in order to differentiate the feature point position calculation section and the lens position control section in the present embodiment from the feature point position calculation section 35 and the lens position control section 33 in the embodiment 1, the feature point position calculation section and the lens position control section in the present embodiment are referred to as a feature point position calculation section 35c and a lens position control section 33c, respectively.

The lens position control section 33c, based on a defocusing amount outputted from a focusing information calculation section 32, generates a control signal for controlling a position of a focus lens 13 and outputs the control signal to a lens driving section 21 and the focal length calculation section 42.

The focal length calculation section 42 calculates a focal length based on the control signal outputted from the lens position control section 33c. When the focal length is greater than or equal to a predetermined value, the focal length calculation section 42 instructs the feature point position calculation section 35c to start the imaging processing with focus tracking. When receiving the instruction for starting the imaging processing with focus tracking from the focal length calculation section 42, the feature point position calculation section 35c starts the imaging processing with focus tracking.

Figure 18:
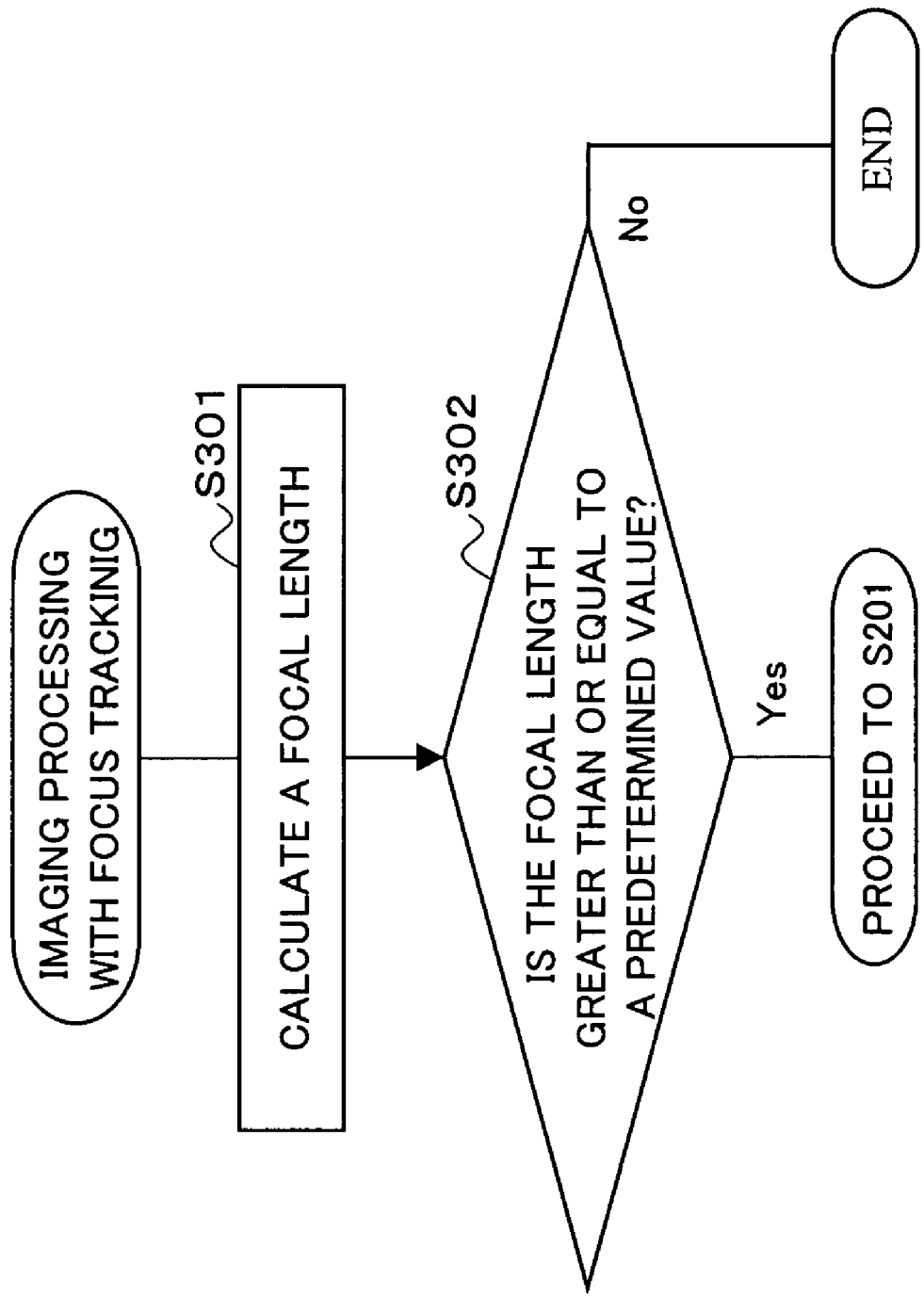
FIG. 18 is a flowchart showing operations of the imaging device according to the embodiment 5 in imaging processing with focus tracking.

FIG. 18 is a flowchart showing operations of the imaging device according to the embodiment 5 in the feature point information setting processing. The flowchart in FIG. 18 shows an operation flow of a program which is executed by the system controller 30c. In FIG. 18, when a shutter button 19a is pressed by a user halfway down, the imaging processing with focus tracking is started.

At step S301, the focal length calculation section 42 calculates a focal length based on the control signal outputted from the lens position control section 33c. Subsequently, at step S302, the focal length calculation section 42 determines whether or not the calculated focal length is greater than or equal to the predetermined value. When the focal length is less than the predetermined value, the focal length calculation section 42 exits the imaging processing with focus tracking.

On the other hand, when the focal length is greater than or equal to the predetermined value, the focal length calculation section 42 proceeds to a process at step S201 shown in FIG. 10. Since the processing at and after step S201 is the same as that in the embodiment 1, FIG. 10 is applied to the present embodiment and descriptions will be omitted.

As described above, according to the present embodiment, when the shutter button is pressed by a user halfway down and a focal length is greater than or equal to the predetermined value, the imaging processing with focus tracking can be started. Thus, even in a case where a travel distance of an object is large when imaging is performed under high magnification, an AF area which is capturing the object can be displayed on a screen in an easily viewable manner.

Embodiment 6

In the embodiments 1 to 5, while the imaging device changes only a position of the AF area frame in accordance with movement of the feature point, a size of the AF area is invariably maintained constant. In contrast to this, an imaging device according to the present embodiment has a feature in that a size of the AF area is altered in accordance with a travel distance of an object.

Figure 19:
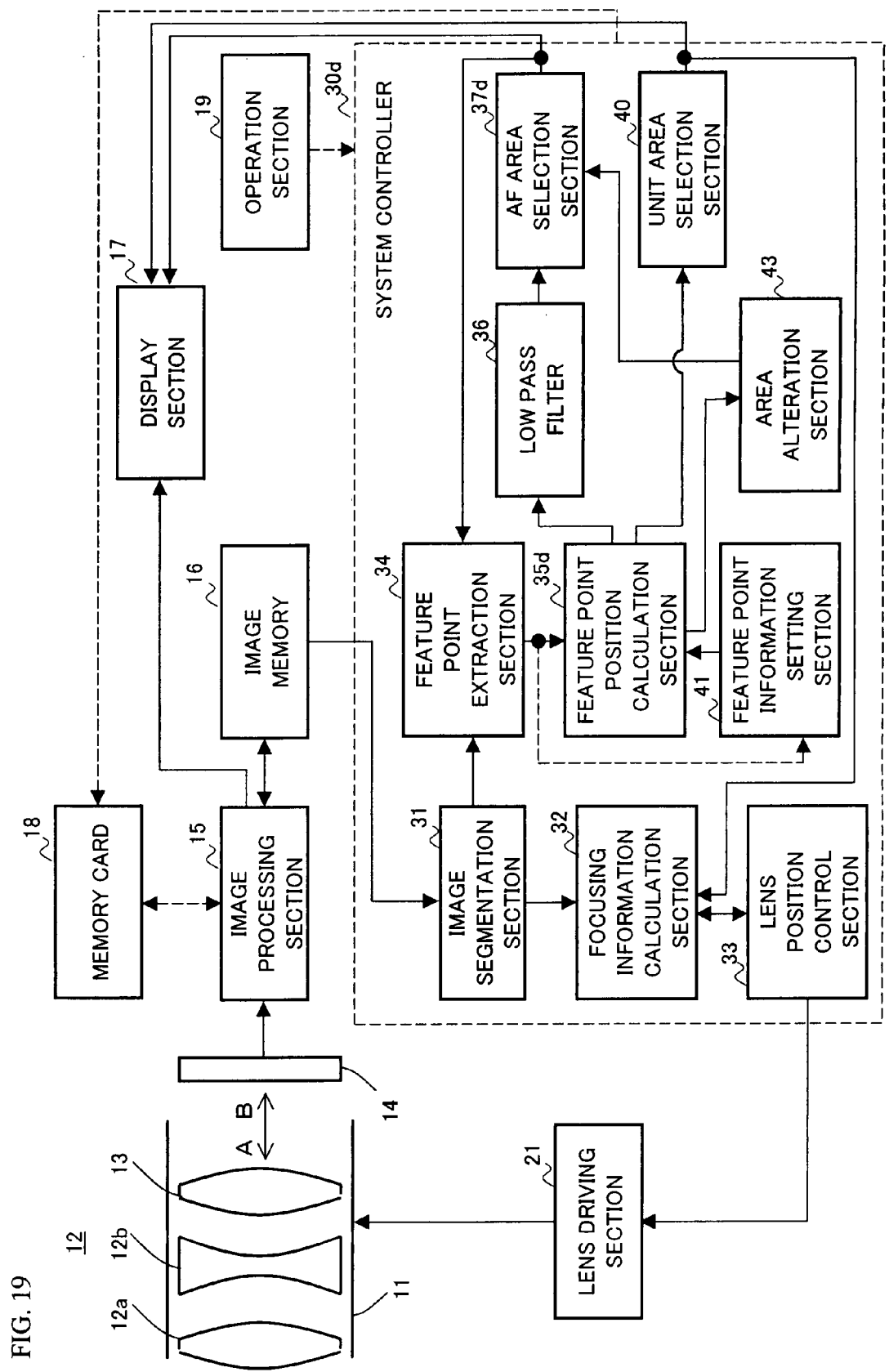
FIG. 19 is a block diagram illustrating a configuration of an imaging device according to an embodiment 6 of the present invention.

FIG. 19 is a block diagram illustrating a configuration of the imaging device according to the embodiment 6 of the present invention. Since the imaging device according to the embodiment 6 has substantially the same configuration as that of the imaging device according to the embodiment 1, the same reference signs as those in FIG. 1 are used to denote components which function in a manner similar to the manner in which the components shown in FIG. 1 function, and detailed descriptions will be omitted.

A system controller 30d shown in FIG. 19 is different from the system controller 30, which is shown in FIG. 1 and is included in the imaging device of the embodiment 1, in that an area alteration section 43 is further included. In the system controller 30d shown in FIG. 19, operations of a feature point position calculation section and an AF area selection section are different from those in the embodiment 1. Therefore, in order to differentiate the feature point position calculation section and the AF area selection section in the present embodiment from the feature point position calculation section 35 and the AF area selection section 37 in the embodiment 1, the feature point position calculation section and the AF area selection section in the present embodiment are referred to as the feature point position calculation section 35d and the AF area selection section 37d, respectively.

The feature point position calculation section 35d, as in the embodiment 1, calculates and outputs coordinates of a feature point of an object in x direction and y direction, which feature point is extracted by a feature point extraction section 34. In the embodiment 1, the feature point position calculation section 35d outputs the coordinate information to the low pass filter 36 and the unit area selection section 40. In contrast to this, in the present embodiment, the feature point position calculation section 35d outputs the coordinate information to a low pass filter 36, a unit area selection section, and the area alteration section 43.

The area alteration section 43 calculates an area of the AF area based on feature point positional information outputted from the feature point position calculation section 35d. Specifically, the area alteration section 43 calculates amplitude of a waveform with respect to the feature point positional information, for example, through detecting an envelope or obtaining a root-mean-square. The area alteration section 43, in accordance with a change in the amplitude, notifies the AF area selection section 37d of a size of the AF area. Hereinafter, an example of calculating the amplitude by performing the envelope detection based on the information of the x coordinate and the y coordinate used as the feature point positional information will be described.

The AF area selection section 37d calculates a display position and an area of the AF area based on the area notified by the area alteration section 43 and the extracted positional information outputted from the low pass filter 36. The AF area selection section 37d outputs the calculated display position and the area of the AF area as the display positional information to a display section 17 and causes the display section 17 to display an AF area frame.

Figure 20:
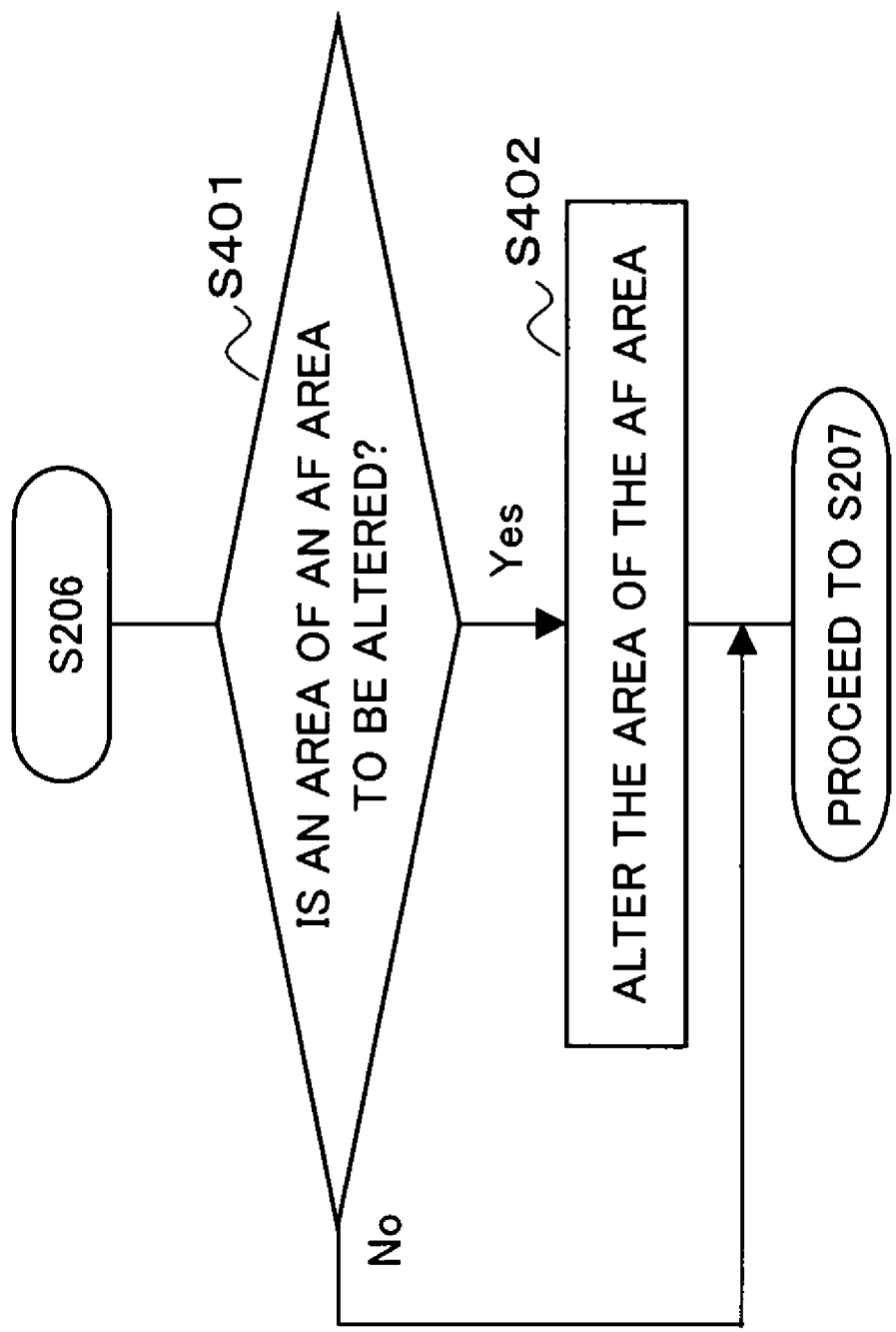
FIG. 20 is a flowchart showing operations of the imaging device according to the embodiment 6 in imaging processing with focus tracking.

In the present embodiment, operations of the imaging device in imaging processing with focus tracking are different from those in the embodiment 1 in the processing at and after step S206 in the flowchart shown in FIG. 10. FIG. 20 is a flowchart showing the operations of the imaging device according to the embodiment 6 in the imaging processing with focus tracking. Hereinafter, with reference to FIGS. 10 and 20, the operations of the imaging device according to the present embodiment will be described.

At step S206 shown in FIG. 10, the AF area selection section 37d selects a display position of the AF area. Next, at step S401 shown in FIG. 20, the area alteration section 43 determines whether or not the area of the AF area is to be altered. Specifically, the area alteration section 43 performs the envelope detection based on a waveform of the feature point positional information and determines whether or not a change in amplitude is greater than or equal to a predetermined value.

When the area of the AF area is to be altered, that is to say, when the change in the amplitude is greater than or equal to the predetermined value, the area alteration section 43 notifies the AF area selection section 37d of the area of the AF area.

Subsequently, at step S402, the AF area selection section 37d, based on the notified area and the extracted positional information, calculates the display position and the area of the AF area and outputs the display position and the size, as the display positional information, to the display section 17. The display section 17 displays an AF area frame based on the display positional information. The processing proceeds to step S207 in FIG. 10. On the other hand, when the size of the AF area is not to be altered, that is to say, when a change in the amplitude is less than or equal to the predetermined value, the area alteration section 43 does not perform the notification of the size of the AF area frame and proceeds to the processing at step S207.

Figure 21:
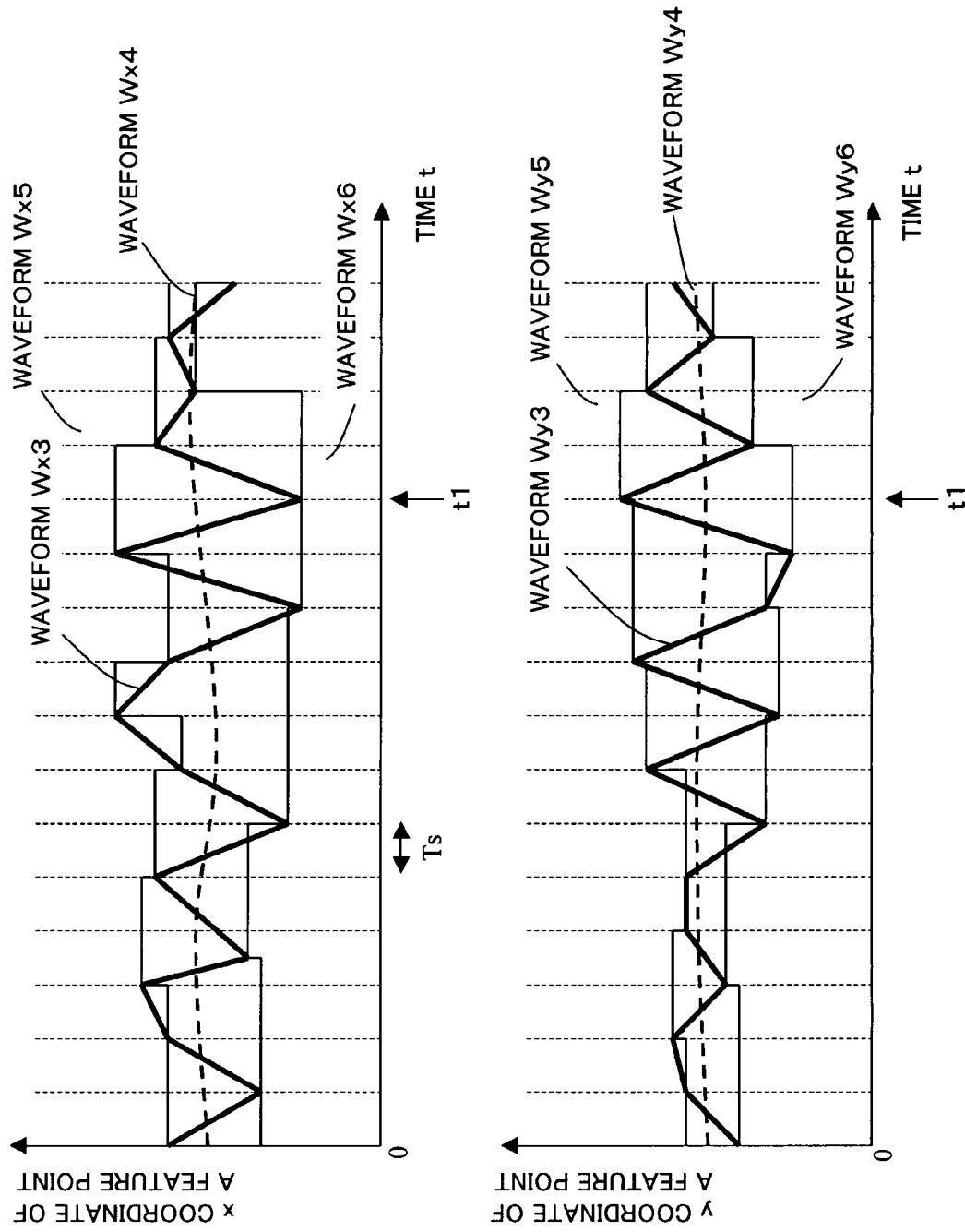
FIG. 21 is a diagram showing coordinates of a feature point, which are calculated by a feature point position calculation section.

FIG. 21 is a diagram showing coordinates of a feature point, which are calculated by the feature point position calculation section 35d. A graph shown in an upper row in FIG. 21 is a graph representing time-series movement of the unit area containing the feature point in x direction. In the graph, a vertical axis indicates x coordinate of the unit area containing the feature point on the display section 17 and a horizontal axis indicates time t. A waveform Wx3 represents movement of a position in the x direction, indicated by the feature point positional information outputted from the feature point position calculation section 35. A waveform Wx4 represents movement of a position in the x direction, indicated by the feature point positional information outputted from the low pass filter 36.

On the other hand, a graph shown in a lower row in FIG. 21 is a graph representing time-series movement of the unit area containing the feature point in y direction. In the graph, a vertical axis indicates y coordinate of the unit area containing the feature point on the display section 17 and a horizontal axis indicates time t. A waveform Wy3 represents movement of a position in the y direction, indicated by the feature point positional information outputted from the feature point position calculation section 35*d*. A waveform Wy4 represents movement of a position in the x direction, indicated by the feature point positional information outputted from the low pass filter 36. The waveforms Wx3, Wx4, Wy3, and Wy4 mentioned here are similar to the waveforms Wx1, Wx2, Wy1, and Wy2 shown in FIG. 13 which are described in the embodiment 1.

When the envelope detection is performed, a predetermined threshold value is previously determined and the envelope detection is performed with respect to values which are greater than or equal to and values which are less than the predetermined threshold value. In FIG. 21, a waveform Wx5 represents a waveform obtained by performing the envelope detection with respect to coordinates which are contained in the waveform Wx3 and are greater than or equal to the predetermined threshold value. A waveform Wx6 represents a waveform obtained by performing the envelope detection with respect to coordinates which are included in the waveform Wx3 and are less than the predetermined threshold value. A difference between the waveform Wx5 and the waveform Wx6 is amplitude in the x direction.

On the other hand, a waveform Wy5 represents a waveform obtained by performing the envelope detection with respect to coordinates which are contained in the waveform Wy3 and are greater than or equal to the predetermined threshold value. A waveform Wy6 represents a waveform obtained by performing the envelope detection with respect to coordinates which are included in the waveform Wy3 and are less than the predetermined threshold value. A difference between the waveform Wy5 and the waveform Wy6 is amplitude in the y direction.

As described above, the area alteration section 43 obtains, as amplitude, a positional change of a feature point of an object in each of the x direction and y direction and calculates the area (the number of unit areas) of the AF area to be displayed.

Figure 22:
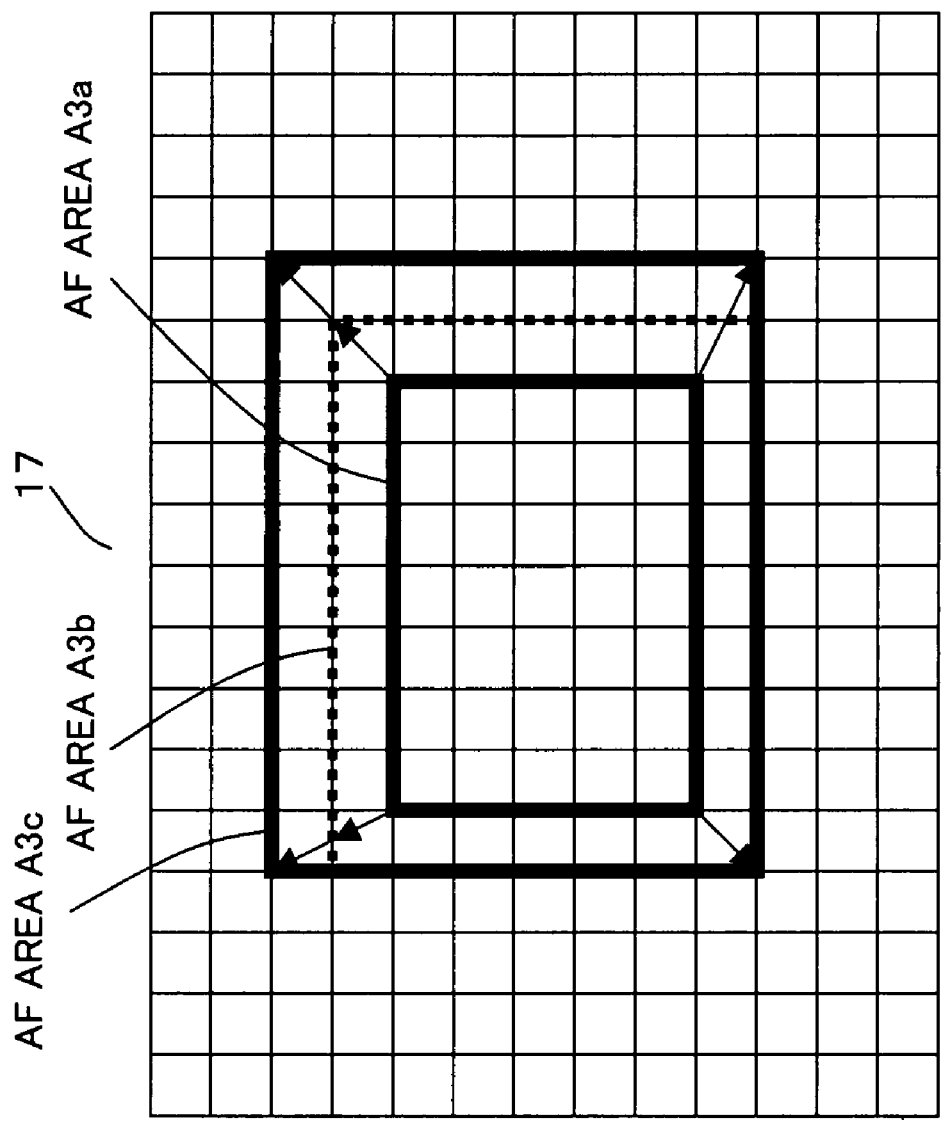
FIG. 22 is a schematic diagram illustrating the display section 17 in the embodiment 6, on which an AF area frame is displayed.
Figure 23A:
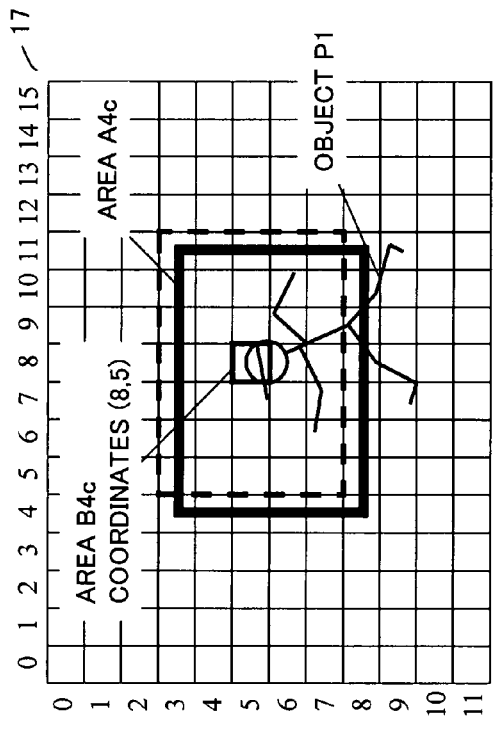
FIG. 23A is a schematic diagram illustrating the display section 17 in an embodiment 7, on which an object and area frames are displayed.
Figure 23C:
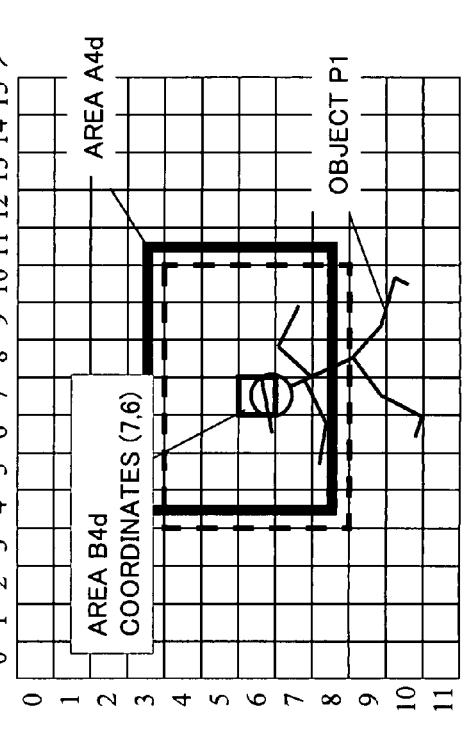
FIG. 23C is a schematic diagram illustrating the display section 17 in the embodiment 7, on which the object and the area frames are displayed.
Figure 23B:
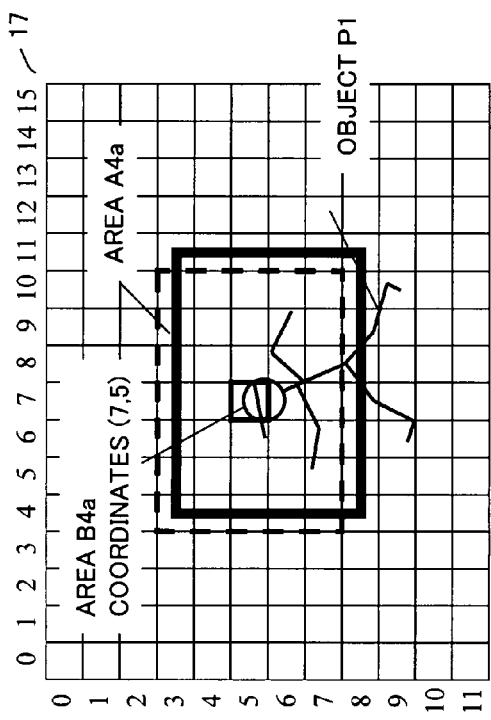
FIG. 23B is a schematic diagram illustrating the display section 17 in the embodiment 7, on which the object and the area frames are displayed.
Figure 23D:
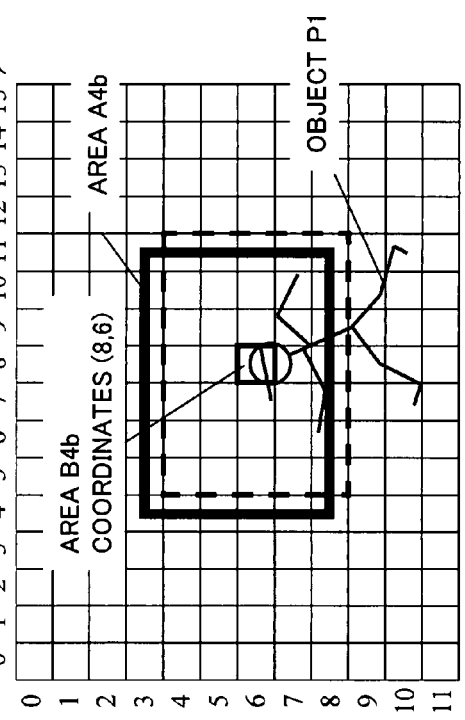
FIG. 23D is a schematic diagram illustrating the display section 17 in the embodiment 7, on which the object and the area frames are displayed.

FIG. 22 is a schematic diagram illustrating the display section 17 in the embodiment 6, on which the AF area frame is displayed. Hereinafter, with reference to FIGS. 21 and 22, a method of controlling a size of the AF area frame displayed on the display section 17 will be described.

In FIG. 21, as the time approaches time t1, a travel distance of an object increases, and further, amplitudes of positional movements of the feature point in the x direction and y direction increase. In a case where the AF area A3*a* consists of 7×5 unit areas at time 0, as the time t approaches the time t1, the size of the AF area frame, displayed on the display section 17, is enlarged in the order of an AF area A3*b* consisting of 9×7 unit areas, and an AF area A3*c* consisting of 10×8 unit areas.

As described above, in the present embodiment, since an element for controlling a size of the AF area so as to follow movements of an object is further included, in addition to the effects described in the embodiment 1 to 5, the size of the AF area can be controlled in accordance with individual differences in a hand-jiggling amount of the body of the imaging device and with a large hand-jiggling amount enlarged when imaging is performed under high magnification. A range in which an object is captured can be displayed in a further stable and an easily viewable manner, since a display position of the AF area frame does not frequently change so as to follow the movements of the object on the screen. The calculation processing for the focus tracking can be performed with a minimum load.

A change in movement of an object, which is caused by an image blur due to hand-jiggling or the like, increases substantially in proportion to a zoom magnification. Therefore, a size of the AF area is altered substantially in proportion to the zoom magnification, thereby allowing enhancement in responsiveness in addition to the function of altering the size through utilizing the envelope detection of a positional change in the feature point.

In the present embodiment, the example in which as shown in FIG. 21, the processing of the envelope detection is performed based on the coordinates of the feature point, which are greater than or equal to and less than the predetermined threshold value, is described. Here, a so-called "peak hold" processing may be performed, in which the current coordinates are obtained as an output of the envelope detection when coordinates of the feature point are greater than or equal to the predetermined threshold values and exceed the previous coordinates, or when coordinates of the feature point are less than the predetermined threshold values and fall below the previous coordinates. After the predetermined time period has passed, the peak hold processing may be reset and restarted from the beginning.

Embodiment 7

In an embodiment 7 of the present invention, the principle of operation of the low pass filter 36 described in the embodiment 1 will be further described in details. In the embodiment 1, it is described that low frequency components of the time-series oscillation frequency in the feature point positional information is extracted and outputted by removing high frequency components from the feature point positional information outputted from the feature point position calculation section 35, and the value of the extracted low frequency component is outputted as the display positional information of the AF area to the AF area selection section 37.

In the present embodiment, a specific configuration of the low pass filter 36 and a method of setting a cut-off frequency fc will be described. Since the imaging device according to the present embodiment has substantially the same configuration as that of the imaging device according to the embodiment 1, the same reference signs as those in FIG. 1 are used to denote components which function in a manner similar to the manner in which the components shown in FIG. 1 function, and detailed descriptions will be omitted.

FIGS. 23A to 23D are schematic diagrams, each of which shows a display section 17 on which an object and area frames are displayed. In FIGS. 23A to 23D, an example in which an image signal to be displayed on the display section 17 is divided into 16 segments in horizontal direction (x direction) and into 12 segments in y direction is shown. In such a case, the image signal is segmented into 16×12 unit areas and unit area frames respectively enclosing the 16×12 unit areas are displayed. Coordinates of the respective unit areas shown in FIGS. 23A to 23D are shown as values 0 to 15 in the x direction and values 0 to 11 in the y direction. For example, in a case of the display section 17 with QVGA (Quarter VGA), the number of pixels in the x direction is 320 and the number of pixels in the y direction is 240. Thus, the unit areas B4a to B4d are defined as areas each having 20 (pixels) ×20 (pixels).

Each of FIGS. 23A to 23D shows a view in which a position of an object P1 displayed on the display section 17 changes, in the order of FIG. 23A, FIG. 23B, FIG. 23C, and FIG. 23D, due to hand-jiggling or movement of the object. The unit area frame containing a feature point of the object, which is extracted by the feature point extraction section 34, moves in the order of an area B4a represented by coordinates (7, 5), an area B4b represented by coordinates (8, 6), an area B4c represented by coordinates (8, 5), and an area B4d represented by coordinates (7, 6).

In FIGS. 23A to 23D, a dotted-line frame shows an AF area frame which moves in accordance with focus tracking performed by the conventional imaging device. In the example shown in FIGS. 23A to 23D, "7", "8", "8", and "7" are outputted in this order as the feature point positional information in the x direction and "5", "6", "", and "6" are outputted in this order as the feature point positional information in the y direction. As mentioned above, the unit area B4 has the 20 (pixels)×20 (pixels). Thus, if the coordinate in the x direction changes from 7 to 8 or from 8 to 7, an image blur by 20 pixels occurs in the x direction, and if the coordinate in the y direction changes from 5 to 6 or from 6 to 5, an image blur by 20 pixels occurs in the y direction. For example, in a case where the feature point positional information is outputted per 1/30 second, and a display position of the AF area frame is moved so that the object is positioned at a central portion of the AF area, the AF area frame in the conventional imaging device moves by each 20 pixels in the x direction or the y direction per 1/30 second. Accordingly, the position of the AF area frame shifts in a jiggling manner, thereby resulting in difficulties to see a display on the screen.

On the other hand, in FIGS. 23A to 23D, a solid-line frame enclosing the areas A4a to A4d shows the AF area frame which moves in accordance with focus tracking performed by the imaging device according to the present embodiment. Since the imaging device according to the present embodiment includes the low pass filter 36 which extracts the low frequency components, jiggling movement of the position of the AF area frame can be prevented.

Figure 24:
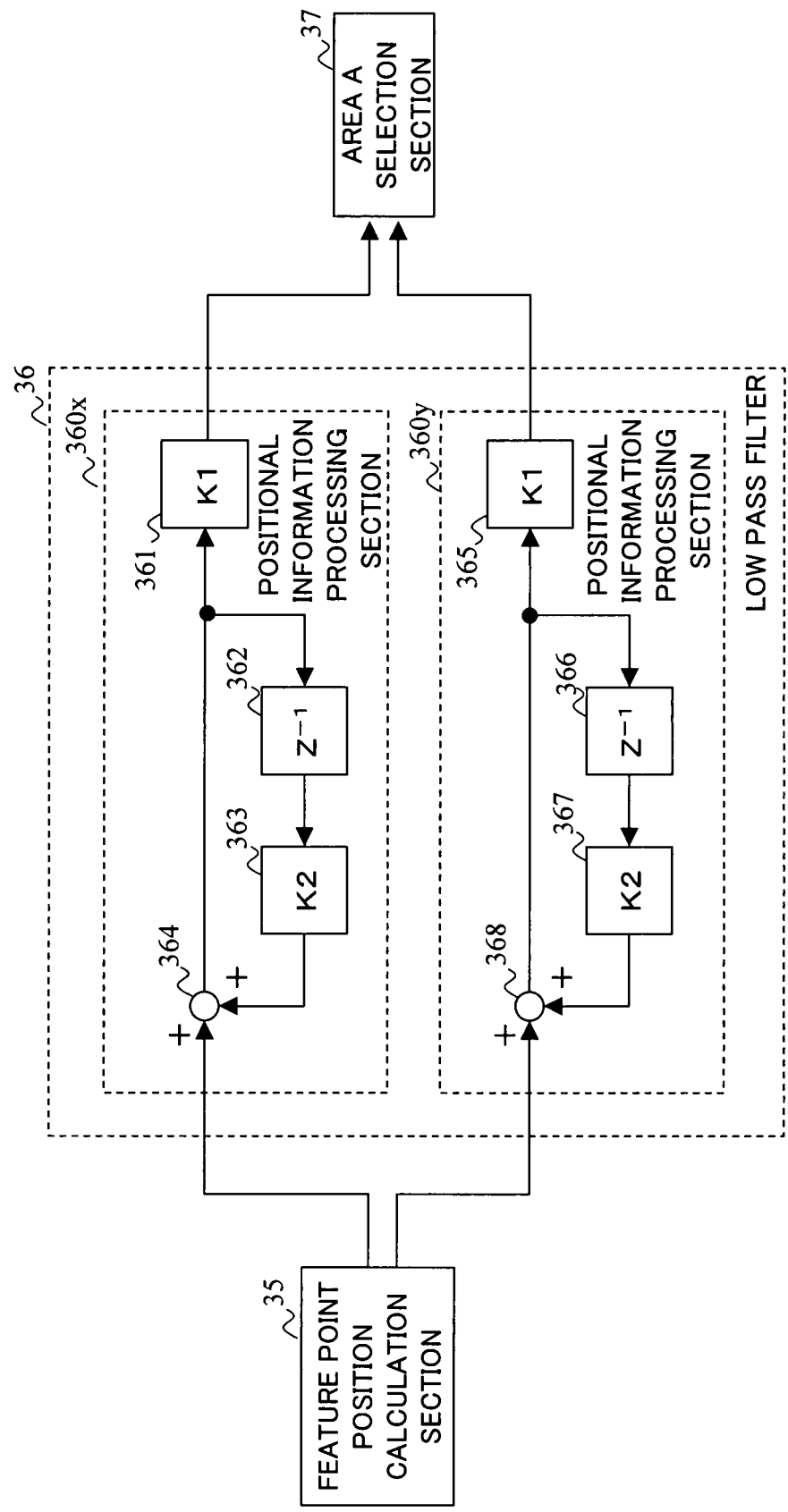
FIG. 24 is a block diagram showing details of a low pass filter 36 in the embodiment 7.

FIG. 24 is a block diagram showing details of the low pass filter 36 according to the present embodiment. FIG. 24 shows a configuration example in a case where the low pass filter 36 is an IIR (Infinite Impulse Response) consisting of digital circuitry.

The low pass filter 36 has a positional information processing section 360x and a positional information processing section 360y. The positional information processing section 360x includes coefficient blocks 361 and 363, a delay block 362, and an addition block 364, extracts and outputs a low frequency component from a time-series oscillation frequency of feature point positional information in x direction. The positional information processing section 360y includes coefficient blocks 365 and 367, a delay block 366, and an addition block 367, extracts and outputs a low frequency component from a time-series oscillation frequency of feature point positional information in y direction. Although the feature point positional information which is processed by the positional information processing section 360x and the feature point positional information which is processed by the positional information processing section 360y are different from each other, basic operations of the positional information processing section 360x and the positional information processing section 360y are the same as each other. Therefore, as a representative example, the positional information processing section 360x will be described.

First, the feature point positional information in the x direction, which has been outputted from the feature point position calculation section 35, is inputted to the addition block 364 in the low pass filter 36. Here, for example, the feature point position calculation section 35 outputs x coordinate of the unit area B4 shown in FIGS. 23A to 23D, as the feature point positional information in the x direction, and outputs y coordinate of the unit area B4 shown in FIGS. 23A to 23D, as the feature point positional information in the y direction. The feature point positional information is updated, for example, per 1/30 second and outputted.

The addition block 364 adds a value outputted from the feature point position calculation section 35 and a value outputted from the coefficient block 363. The coefficient block 361, using a predetermined coefficient K1, processes the value obtained through the addition by the addition block 364 and outputs a resultant to an area A selection section 37.

The delay block 362 delays the value obtained through the addition by the addition block 364 for a predetermined time period and outputs the value to the coefficient block 363. In the present embodiment, the delay block 362 is supposed to delay an inputted signal by 1/fs=1/30 second and output the signal (fs: sampling frequency).

The coefficient block 363 processes a value outputted from the delay block 362 using a predetermined coefficient K2 and outputs a resultant to the addition block 364.

Here, a cut-off frequency is represented by fc. If a formula fc<<fs is satisfied, the low pass filter can be obtained by setting K1 and K2, which are represented by the following formulae (1) and (2), as the coefficients.

$$K1=1/\{1+1/(30\times 2\times\pi\times fc)\} \quad (1)$$

$$K2=1/\{1+(30\times 2\times\pi\times fc)\} \quad (2)$$

As shown in the above formulae (1) and (2), when the cut-off frequency fc is decreased, a moving amount of the AF area frame can be reduced. Accordingly, through appropriately setting the cut-off frequencies fc related to the coefficients K1 and K2, the moving amount of the AF area frame can be adjusted. Hence, it is understood that it is only required to set the cut-off frequencies fc such that a user does not feel vibration of the AF area frame.

Figures 25A, 25B:
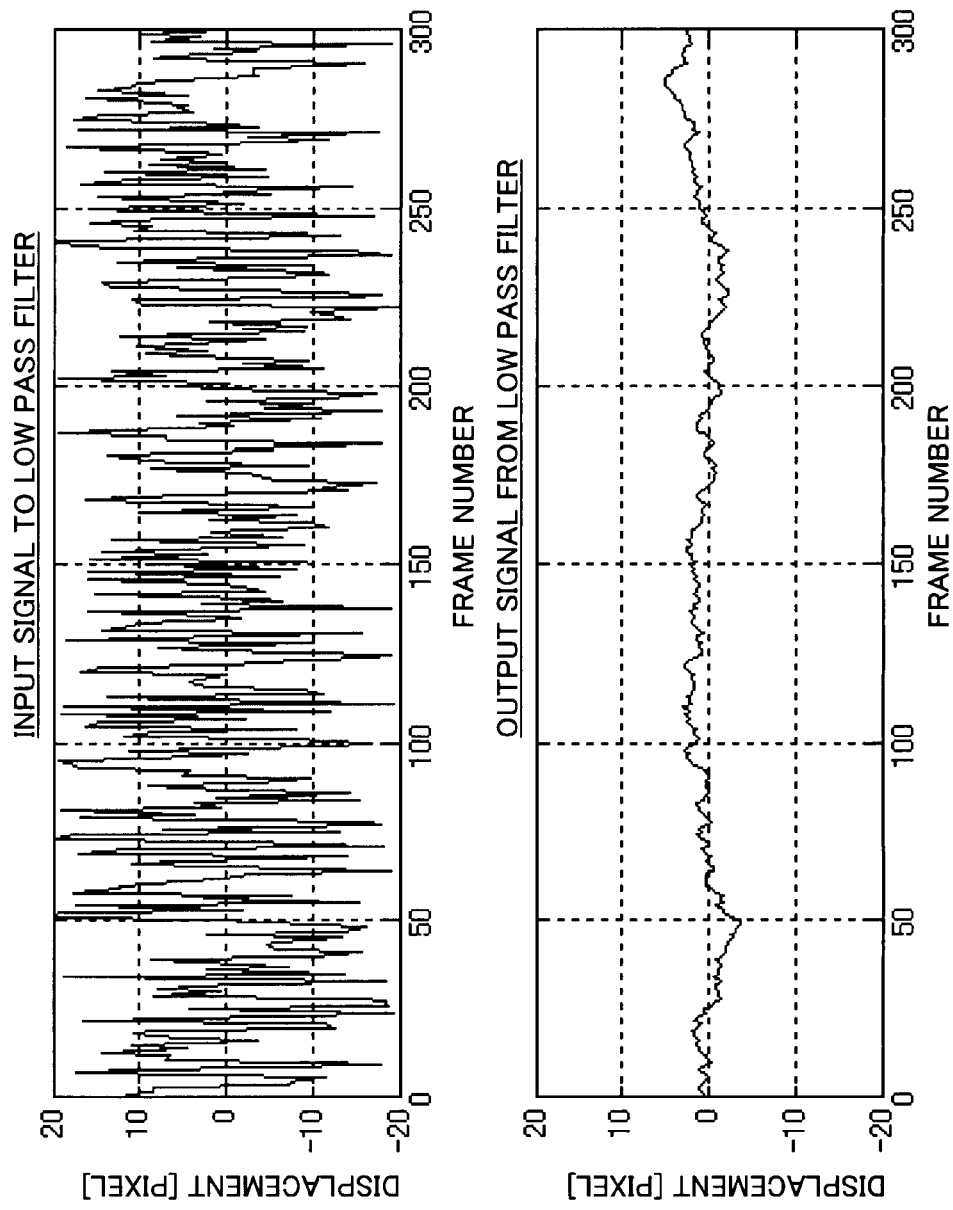
FIG. 25A is a diagram showing a waveform of an input signal to the low pass filter 36 in the embodiment 7.
FIG. 25B is a diagram showing a waveform of an output signal from the low pass filter 36 in the embodiment 7.

FIGS. 25A and 25B show input/output signal waveforms of the low pass filter 36. FIG. 25A is a diagram showing a waveform of an input signal which is inputted to the low pass filter 36 and FIG. 25B is a diagram showing a waveform of an output signal which is outputted from the low pass filter 36. In FIGS. 25A and 25B, a vertical axis indicates the number of pixels, which corresponds to a displacement amount of an object, and a horizontal axis indicates a frame number.

To the low pass filter 36, two kinds of signals, i.e., signals of the x direction and y direction, are inputted. In FIGS. 25A and 25B, a waveform of one of the two kinds of the input signals and a waveform of an output signal are shown. FIG. 25B is a graph representing a monitored output signal outputted from the low pass filter 36, to which the input signal shown in FIG. 25A is inputted, in a case where the coefficient K1 and K2 are set using the cut-off frequency fc=0.2 Hz.

In FIG. 25A, an example in which a position of an object represented by the input signal changes within a range of ±20 pixels. The output signal shown in FIG. 25B indicates that the input signal inputted to the positional information processing sections 360x and 360y in the low pass filter 36, in which the cut-off frequency fc=0.2 Hz is set, is attenuated and outputted. In a case where a periodic interval of updating the frame is 1/30 second, a time period required for frame numbers 0 to 300 is 10 seconds.

Next, a degree of an image blur of an object displayed on the display section 17 was evaluated while changing the cut-off frequency fc of the low pass filter 36 according to the present embodiment. Specifically, 10 test subjects evaluated the image blur of an object displayed on a 2.5-inch monitor screen with QVGA. The degree of the image blur is evaluated: one point given when "there is no problem of the image blur"; 0.5 point given when "there is no opinion"; and zero point given when "there is a problem of the image blur".

The cut-off frequency fc of the low pass filter was changed in a phased manner to 5 Hz, 4 Hz, 3 Hz, 2 Hz, 1 Hz, 0.5 Hz, and 0.2 Hz, 0.1 Hz, etc., and the image blur for each case is evaluated by the test subjects.

Figure 26:
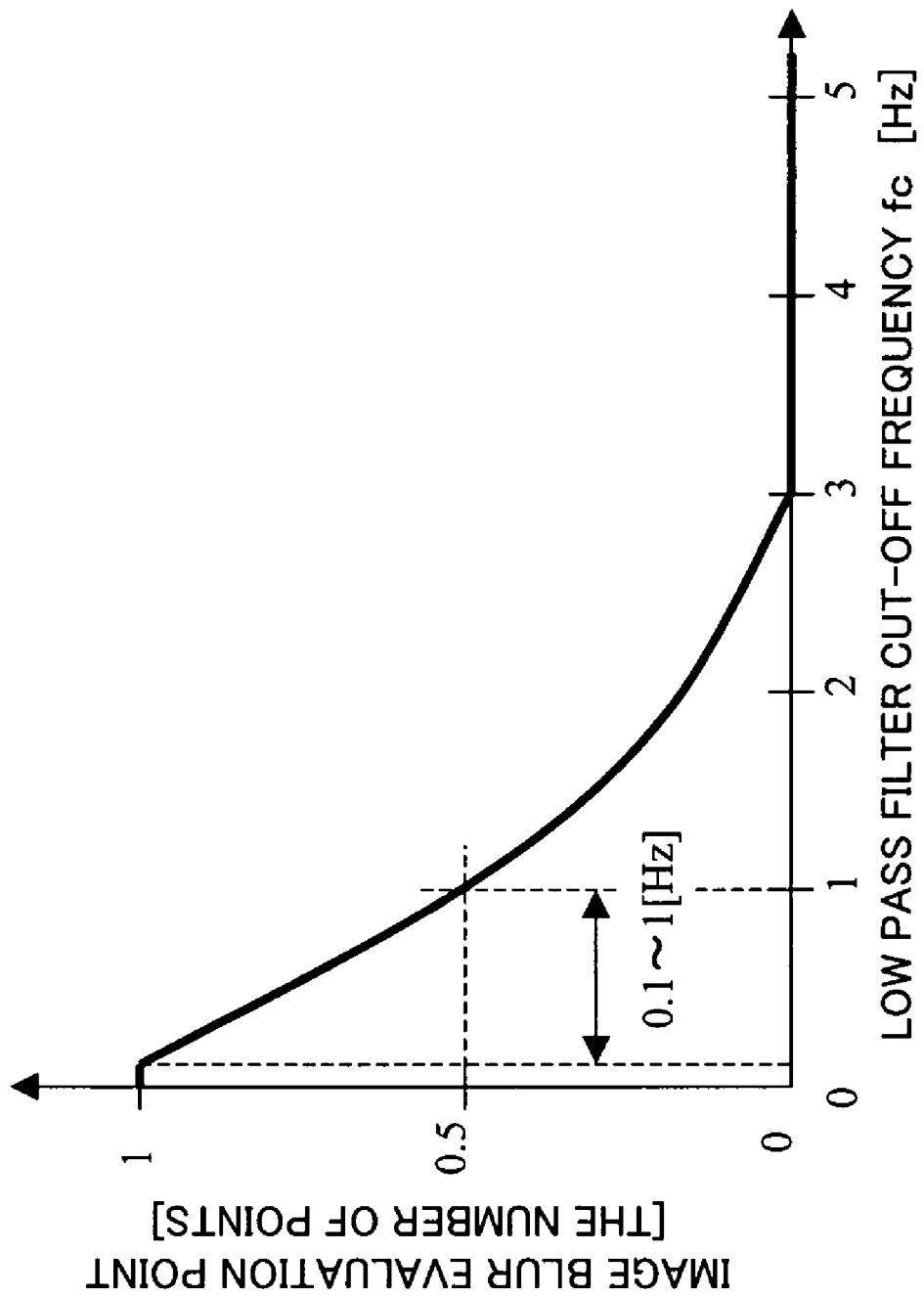
FIG. 26 is a graph showing a relationship between cut-off frequencies fc of the low pass filter 36 and image blurring evaluation points in the embodiment 7.

FIG. 26 is a graph showing a relationship between the cut-off frequencies fc of the low pass filter 36 and the image blur evaluation points given by the test subjects. In FIG. 26, a vertical axis indicates an average of the image blur evaluation points given by the test subjects and a horizontal axis indicates the cut-off frequency fc.

As shown in FIG. 26, as a result of the evaluation, when the cut-off frequency fc of the low pass filter 36 was set to be larger than 1 Hz, the proportion of the evaluation given when "there is a problem of the image blur" was large. On the other hand, when the cut-off frequency fc of the low pass filter 36 was set to be less than or equal to 1 Hz, the proportion of the evaluation given when "there is no problem of the image blur" increased from the proportion of the evaluation given when "there is a problem of the image blur". Further, when the cut-off frequency fc of the low pass filter 36 was set to be less than or equal to 0.1 Hz, almost all of the test subjects evaluated that "there is no problem of the image blur".

As described above, by setting the cut-off frequency fc of the low pass filter to being range of 0.1 Hz to 1 Hz, jiggling movements or jerky movements of the AF area frame can be reduced, and the AF area frame can be displayed on the monitor screen in a comparatively viewable manner. As shown in FIGS. 23A to 23D, even if the object P1 is moving in a jiggling manner per 1/30 second, according to the present embodiment, the display position of the AF area frame which is indicated by the solid-line frame can be stabilized, such that the moving range of the object P1 is located roughly at the central portion.

Next, the moving range of the AF area frame, which is easily viewable for a user, will be specifically described. In a case of assuming that a position of an object in each of the x direction and y direction, represented by the input signal inputted to the low pass filter, is randomly changed per 1/fs second in a range of 40 pixels, a range of frequencies, in which the input signal is present can be defined as ½ of a sampling frequency fs. An average power of the input signal which is present in the range of fs/2 is statistically expressed by a formula fc×π/2. Accordingly, the power of the output signal which has passed through the low pass filter 36 is attenuated to (fs×π/2)/(fs/2). Here, because of a relationship of voltage≈power$^{(1/2)}$, a displacement amount Px and a displacement amount Py of the cut-off frequencies fc in the x direction and y direction, which are outputted from the primary low pass filter, can be expressed by the following formulae (3) and (4).

$$Px \approx \{(fc \times \pi/2)/(fs/2)\}^{(1/2)} \times 40 \quad (3)$$

$$Py \approx \{(fc \times \pi/2)/(fs/2)\}^{(1/2)} \times 40 \quad (4)$$

In the formulae (3) and (4), for example, in a case where the cut-off frequencies fc is a parameter, movements of the display position of the AF area frame can be reduced in the following manner.

Px=Py≈29(pixels) in a case of fc=5 Hz
Px=Py≈26(pixels) in a case of fc=4 Hz
Px=Py≈22(pixels) in a case of fc=3 Hz
Px=Py≈18(pixels) in a case of fc=2 Hz
Px=Py≈13(pixels) in a case of fc=1 Hz
Px=Py≈9(pixels) in a case of fc=0.5 Hz
Px=Py≈6(pixels) in a case of fc=0.2 Hz
Px=Py≈4(pixels) in a case of fc=0.1 Hz As described above, in a case where a periodic interval of updating the monitor screen is 1/30 second, in a range of fc=0.1 Hz to 1 Hz, the image blur within 4 to 13 pixels remains. However, movement of the display position of the AF area frame is reduced within 1 to 5% of 320 (pixels)×240 (pixels) of the QVGA screen size, and jiggling movement of the AF area frame in accordance with the movement of an object is avoided, thereby enhancing viewability of a display on the screen.

In addition, in the present embodiment, the low pass filter 36 is the digital filter. Thus, through altering the cut-off frequencies fc and the coefficients of the low pass filter, conditions of displaying the AF area frame can be easily set/altered. Accordingly, the conditions can be easily set such that the AF area frame can be easily viewable taking into account a difference among the image blur amounts due to a size of the monitor screen, or due to a size or type of the body of the imaging device.

In the present embodiment, the example in which the cut-off frequency fc of the low pass filter is set to be in the range of 0.1 Hz to 1 Hz so as to display the AF area frame based on the positional information outputted from the low pass filter, which suppresses time-series change in the positional information of an object. However, the cut-off frequencies fc may be set to the extent that a user does not feel jiggling vibration of the AF area frame and may be appropriately determined in accordance with, for example, the number of pixels of the screen, a contrast thereof, or a size of an object. In the present embodiment, one example in which the degree of the image blur is suppressed to the extent within 4 to 13 pixels for the monitor screen of the 2.5-inch QVGA display in order to make the screen comparatively easily viewable. However, when the monitor screen is a 2.5-inch 640×480-pixel VGA display, if the degree of the image blur is suppressed within 8 to 26 pixels in proportion to an increase in a resolution in either one of directions, the display on the screen can be made comparatively easily viewable. Further, when the monitor screen is a 3-inch VGA, if the degree of the image blur is suppressed within 6.7 to 10.8 pixels in inverse proportion to an increase in the number of inches, the display on the screen can be made comparatively easily viewable.

Although the exemplary case where the coefficients K1 and K2 in the IIR digital filter are expressed by the formulae (1) and (2), respectively, is described herein, the coefficients may be freely selected such that the cut-off frequencies are in the above-mentioned range. The low pass filter is not limited to the IIR filter and may be an FIR (Finite Impulse Response) filter, a secondary digital filter, or other high-order digital filter. The low pass filter may be an analog filter. In this case, the feature point positional information of an object may be extracted once as an analog signal. The digital filter may be realized by being programmed in a microcomputer or may be realized by a piece of hardware.

The imaging device according to each of the respective embodiments is not limited to the specified modes and can be appropriately modified. For example, although the exemplary case in which the imaging device according to each of the respective embodiments is the digital still camera which obtains a still picture when the shutter button is operated by a user is described, the imaging device is applicable to a digital video camera which continues to obtain an image at predetermined timing while an imaging button is being operated. In this case, even when an object moves, the focus tracking can be performed. The imaging device according to each of the respective embodiments may be applied to a surveillance camera, a in-vehicle camera, or a web camera, In such a case, although it may be difficult for a user to operate a shutter button, the shutter button may be, for example, automatically operated at predetermined timing or remote-controlled.

Although the imaging device according to each of the respective embodiments separately includes the system controller, the imaging device may be applied to an imaging system including a control CPU, by which the system controller is substituted, in a personal computer or in a mobile-phone unit. The components may be arbitrarily combined. For example, a variety of examples of combinations, such as a system example in which an imaging optical system and an image sensor are physically separated from other components and a system example in which an imaging optical system, an image sensor, and an image processing section are physically separated from other components, may be made.

INDUSTRIAL APPLICABILITY

The present invention is suited to an imaging device such as a digital still camera and digital video camera.

The invention claimed is:

1. An imaging device comprising:
an imaging optical system operable to form an optical image of an object;
an image sensor operable to take the optical image of the object and to convert the optical image to an electric image signal;
a feature point extraction section operable to extract a feature point of the object based on the generated electric image signal; and
a display section operable to display an image based on the generated electric image signal and an area frame indicating a position of the feature point in a manner that the area frame is overlaid onto the image when displayed,
wherein the display section displays the area frame so that a high frequency component of a time-series oscillation of a positional movement of the area frame is smaller than a high frequency component of a time-series oscillation of a positional movement of the same feature point on the display section.

2. The imaging device according to claim 1, wherein the area frame indicates the position of the feature point by following a low frequency component of the time-series oscillation of the positional movement of the feature point.

3. The imaging device according to claim 1 or 2, further comprising a feature point setting section operable to previously set information pertinent to the feature point,
wherein the feature point extraction section extracts a feature point of the object, based on a result of a comparison between the obtained image signal and the information pertinent to the feature point which has been pre-set by the feature point setting section.

4. The imaging device according to claim 3, wherein the feature point setting section sets reference color information as the information pertinent to the feature point, and
the feature point extraction section calculates color information from the obtained image signals and extracts the feature point based on the comparison between the calculated color information and the reference color information which has been pre-set by the feature point setting section.

5. The imaging device according to claim 4, wherein the reference color information is color information which is calculated by the feature point extraction section with respect to a desired one of the areas in the previously obtained image signal.

6. The imaging device according to claim 5, wherein at least one of the color information and the reference color information contains at least one of information pertinent to a hue and information pertinent to a saturation.

7. The imaging device according to claim 1 or 2, wherein the feature point extraction section extracts edge information of the object.

8. The imaging device according to claim 1 or 2, wherein the feature point extraction section extracts luminance information of the object.

9. The imaging device according to claim 3, wherein the feature point extraction section extracts edge information of the object.

10. The imaging device according to claim 3, wherein the feature point extraction section extracts luminance information of the object.

* * * * *